US007618320B2

(12) United States Patent
Hashimoto et al.

(10) Patent No.: US 7,618,320 B2
(45) Date of Patent: Nov. 17, 2009

(54) NETWORK GAME SYSTEM, AND GAME TERMINAL DEVICE AND STORAGE MEDIUM USED THEREFOR

(75) Inventors: Hirotada Hashimoto, Tokyo (JP); Haruyuki Hashimoto, Tokyo (JP); Takashi Uryu, Tokyo (JP); Toru Shida, Yokohama (JP); Toru Ohara, Tokyo (JP); Chie Yoshida, Kawasaki (JP); Masami Hayashi, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 1248 days.

(21) Appl. No.: 10/852,251

(22) Filed: May 25, 2004

(65) Prior Publication Data
US 2005/0026696 A1 Feb. 3, 2005

Related U.S. Application Data

(62) Division of application No. 09/647,241, filed as application No. PCT/JP00/00483 on Jan. 28, 2000, now Pat. No. 6,848,997.

(30) Foreign Application Priority Data

| Jan. 28, 1999 | (JP) | ................................... 11-20078 |
| Aug. 19, 1999 | (JP) | ................................. 11-233226 |
| Sep. 22, 1999 | (JP) | ................................. 11-269525 |

(51) Int. Cl.
*A63F 9/24* (2006.01)
(52) U.S. Cl. ......................................... 463/29; 463/42
(58) Field of Classification Search ........................ None
See application file for complete search history.

(56) References Cited

U.S. PATENT DOCUMENTS

| 5,347,632 | A |   | 9/1994 | Filepp et al. |
| 5,558,339 | A |   | 9/1996 | Perlman |
| 5,674,127 | A |   | 10/1997 | Horstmann et al. |
| 5,768,382 | A | * | 6/1998 | Schneier et al. ............. 380/251 |
| 5,828,843 | A | * | 10/1998 | Grimm et al. ............... 709/228 |
| 6,006,334 | A |   | 12/1999 | Nguyen et al. |

(Continued)

FOREIGN PATENT DOCUMENTS

CN 1191032 A 5/1996

(Continued)

OTHER PUBLICATIONS

ASCII Corporation, "Internet ASCII," vol. 3, No. 12, Dec. 1, 1998, pp. 132-135.

(Continued)

*Primary Examiner*—M. Sager
(74) *Attorney, Agent, or Firm*—Finnegan, Henderson, Farabow, Garrett & Dunner, L.L.P.

(57) ABSTRACT

In this game system, a plurality of game devices are connected to a game parent station over a communication network, and an online game application may be executed on the game devices by means of the game parent station. In this game system, the game devices are provided with a personal information processing means that can exchange personal information with other players while the online game application is executed among the game devices. Therefore, personal information in the form of a business card may be exchanged with an opponent by means of the personal information processing means either after a game has ended or when a game begins.

14 Claims, 28 Drawing Sheets

U.S. PATENT DOCUMENTS

| | | | |
|---|---|---|---|
| 6,015,348 A | * | 1/2000 | Lambright et al. ............ 463/42 |
| 6,128,660 A | * | 10/2000 | Grimm et al. ............... 709/227 |
| 6,152,824 A | * | 11/2000 | Rothschild et al. ............ 463/42 |
| 6,178,510 B1 | * | 1/2001 | O'Connor et al. ............... 726/5 |
| 6,196,920 B1 | * | 3/2001 | Spaur et al. .................... 463/42 |
| 6,692,359 B1 | | 2/2004 | William et al. |

FOREIGN PATENT DOCUMENTS

| | | |
|---|---|---|
| JP | 57-172440 | 10/1982 |
| JP | 63-118668 | 1/1988 |
| JP | 1-250228 | 10/1989 |
| JP | 5-274267 | 10/1993 |
| JP | 1993-324551 | 12/1993 |
| JP | 8-47582 | 2/1996 |
| JP | 8-98956 | 4/1996 |
| JP | 8-129535 | 5/1996 |
| JP | 10-320354 | 4/1998 |
| JP | 8-155145 | 6/1998 |
| JP | 10-269184 | 10/1998 |
| JP | 10-295939 | 11/1998 |
| WO | WO 96/37866 | 11/1996 |
| WO | WO 98/47091 | 10/1998 |

OTHER PUBLICATIONS

Kohgakusha Co. Ltd., "I/O," vol. 23, No. 10, Oct. 1, 1998, pp. 102-103.

Shogakukan Inc., "Latest PC Network Game Encyclopedia," Jan. 1, 1999, pp. 58-61.

Notification of Reasons for Refusal, Japanese Patent Office, Mar. 18, 2002.

Search Report from the European Patent Office for European Patent Application No. EP 07 01 4138, dated Jul. 4, 2008 (5 pages).

Translation of JP 08-047582 by PAJ at JPO.

Translation of JP 08-098956 by JAJ at JPO.

Translation of JP 08-129535 by PAJ at JPO.

Facemaker program by Spinnaker Software, copyright 1984, 6 pages.

'Leisure Suit Larry 4' by Al Lowe, 4 pages.

New on-line service allows people to play games with strangers by Rick Ratliffe, Austin American Statesman, published Jan. 20, 1992, 2 pages.

The Official American Online Membership Kit & Tour Guide, copyright 1992, pp. 1-9, 70-74, 89-95, 233-263, 257-261.

Patent Abstracts of Japan for JP 10320354, publication date Apr. 12, 1998.

DOS/V Magazine, vol. 6, No. 10, May 1997.

International Search Report, May 16, 2000.

"Ultima Online Strategies & Secrets," (Unofficial), Prentice Hall Japan, May 31, 1998, 1$^{st}$ Edition, pp. ix-x.

Notice of Reasons for Rejection from the Japanese Patent Office in Japanese Application No. 2000-338942 mailed Sep. 3, 2007 (3 pages).

* cited by examiner

FIG.15

| No. | NUMBER OF MEETINGS | CARD COLOR :CL | CHARACTER MOTION: MO | CHARACTER BACKGROUND (P1) : BK | TITLE : SR | ONE'S OWN GENDER →OPPONENT'S GENDER | REMARKS |
|---|---|---|---|---|---|---|---|
| 001 | 1 OR MORE | 1st STAGE | BASIC STANDBY | 22 | FRIENDS | M/F → M/F | |
| 002 | 2 OR MORE | 2nd STAGE | BASIC STANDBY + GREETING | 4 | STRONG FRIENDSHIP | M → M | |
| 003 | 2 OR MORE | 2nd STAGE | BASIC STANDBY + GREETING | 4 | FRIENDSHIP | M → F, F → M | |
| 004 | 2 OR MORE | 2nd STAGE | BASIC STANDBY + GREETING | 4 | CLOSE FRIENDS | F → F | |
| 005 | 4 OR MORE | 3rd STAGE | BASIC STANDBY + EXPRESSION OF HAPPINESS 4 | 3 | BUDDIES | M → M | |
| 006 | 4 OR MORE | 3rd STAGE | BASIC STANDBY + EXPRESSION OF HAPPINESS 4 | 3 | AMICABLE RELATIONSHIP | M → F, F → M | |
| 007 | 4 OR MORE | 3rd STAGE | BASIC STANDBY + EXPRESSION OF HAPPINESS 4 | 3 | PRAISABLE FRIENDSHIP | F → F | |
| 008 | 6 OR MORE | 4th STAGE | BASIC STANDBY + EXPRESSION OF HAPPINESS 3 | 2 | INTENSE FRIENDSHIP | M → M | |
| 009 | 6 OR MORE | 4th STAGE | BASIC STANDBY + EXPRESSION OF HAPPINESS 3 | 2 | INTIMATE FRIENDSHIP | M → F, F → M | |
| 010 | 6 OR MORE | 4th STAGE | BASIC STANDBY + EXPRESSION OF HAPPINESS 3 | 2 | SECRETIVE RELATIONSHIP | F → F | |
| 011 | 8 OR MORE | 5th STAGE | BASIC STANDBY + EXPRESSION OF HAPPINESS 2 | 10 | MASCULINE FRIENDSHIP | M → M | |
| 012 | 8 OR MORE | 5th STAGE | BASIC STANDBY + EXPRESSION OF HAPPINESS 2 | 10 | GOOD RELATIONSHIP (+HEART MARK) | M → F, F → M | |
| 013 | 8 OR MORE | 5th STAGE | BASIC STANDBY + EXPRESSION OF HAPPINESS 2 | 10 | BEAUTIFUL FRIENDSHIP | F → F | |
| 014 | 10 OR MORE | 6th STAGE | BASIC STANDBY + EXPRESSION OF HAPPINESS 1 | 1 | BEST FRIENDS | M/F → M/F | |

(SENDING SIDE)

| | |
|---|---|
| ① | PLAYER'S NAME DATA |
| ② | PLAYER'S FACE DATA |
| ③ | PLAYER'S HOT SPRING MEMBERSHIP NUMBER |
| ④ | TOTALS OF TOURNAMENT PLAY DATA |
| ⑤ | NUMBER OF TOURNAMENT MATCHES |
| ⑥ | PLAYER'S IP ADDRESS |
| ⑦ | PLAYER'S PERSONAL ID |
| ⑧ | BAD ACTS INFORMATION |

NETWORK GAME SYSTEM, AND GAME TERMINAL DEVICE AND STORAGE MEDIUM USED THEREFOR

This is a divisional application of application Ser. No. 09/647,241, filed Feb. 6, 2001, which is a 371 of PCT/JP00/0483 filed Jan. 28, 2000, which are incorporated herein by reference.

TECHNICAL FIELD

The present invention relates to a network game system wherein a plurality of game terminal devices are mutually linked via a communication means so that a prescribed game application program may be executed among the game terminal devices, as well as to a game terminal device used in this system and to a storage medium on which the game application program is stored.

BACKGROUND ART

Conventional network game systems of this type comprise a server machine and video game devices which are terminal devices, and the server machine and each video game device are either directly connected by means of a telephone line, or they are connected over the Internet by means of an Internet service provider. The terminal devices receive control from the server machine and a common game application program, so that a common game space for competitive games or the like is constructed between the terminal devices, and players may play games inside this space.

In recent years, many different network game systems of this type have been developed, and the number of players using them has been increasing remarkably. In these game systems, anyone may access the network game system so long as they fulfill the specified requirements to be a player.

In a network game system, even though players who are total strangers play against each other in a competitive game, the information exchanged between players is limited to their names and player IDs, and the problem exists that for the players who participate in the network game system, the information they receive regarding their opponent is insufficient.

Furthermore, in this type of game system, the game proceeds under restrictions applicable to all of the players. For example, while the game is underway, the players are prohibited from discontinuing the game until a match is completed. However, even where a player performs such a prohibited action, in the conventional game system, measures such as terminating the game being played over a network have not been adopted, in order to protect the other players.

Moreover, when a players does decide to play a network game, the player usually connects the game terminal device to the dedicated server over the Internet. Therefore, some time must be spent verifying the player's ID and password. Because it requires a certain amount of time to connect to the network (approximately five minutes), during this time, the problem arises that the player becomes tired of looking at still images on his or her (hereinafter 'his' for convenience) screen.

Furthermore, the verification of players' IDs and passwords is individually performed by the servers that manage the respective network game programs, and at present, information is not exchanged between the plurality of game servers. As a result, when a bad act occurs while one game server is being accessed, i.e., while a specific network game is being played, even if access to the specific game server is subsequently prohibited, it is easy for the player who committed the bad act to access other game servers, which hinders the smooth operation of the network games.

Accordingly, an object of the present invention is to provide a network game system wherein sufficient information regarding other players connected to the system is provided to the player. Another object of the present invention is to provide a network game system wherein necessary personal information regarding players may be easily exchanged among terminal devices connected to the network game system.

Another object of the present invention is to provide a network game system wherein it is easy for players to verify this personal information. Yet another object of the present invention is to provide a network game system wherein when a game is played over the Internet, appropriate measures are taken against players who violate pre-established rules, such that violations are prevented, and anyone can easily and enjoyably play the game.

Yet another object of the present invention is to provide a network game system wherein players having a game terminal device are not forced to become impatient during the time interval required for their game terminal device to connect to the network.

Still another object of the present invention is to obtain a network game system wherein, where a plurality of game terminal devices and a plurality of servers are connected over a network, it may be determined on a system-wide basis whether each game terminal device is authorized to access the network.

Still another object of the present invention is to provide a game terminal device used in this network game system. A further object of the present invention is to provide a storage medium on which is stored a program by which to execute the network game on the game terminal device in order to obtain the objects described above.

DISCLOSURE OF THE INVENTION

In order to achieve the objects described above, the present invention provides a network game system which is constructed such that a plurality of game terminal devices are connected to each other and each game terminal device is capable of executing a specified game application program, and is characterised in that it has (i) a plurality of game servers to manage information pertaining to the individual game application programs, and (ii) an authentication server that is provided independently of said game servers, acts as a common server to the plurality of game servers, and has a function to determine whether or not each of the terminal devices should be permitted to access the game servers.

In other words, use of an authentication server that serves the plurality of game servers in common eliminates the need to individually determine whether or not access to a game server is authorized, and allows an accurate determination to be made based on information regarding the individual game application programs.

Furthermore, in the present invention, the common authentication server is characterised in that it performs initial registration to permit the terminal devices to access the game servers, and after registration, determines whether or not each terminal device is authorized to access the game servers.

Users participating in the network game system must first perform initial registration of their IDs and passwords using the game terminal device. If this initial registration is carried out using the common authentication server, there is no need to perform initial registration each time one of the plurality of game servers is accessed.

Moreover, the present invention is characterised in that information regarding a game terminal device is input to the common authentication server from the plurality of game servers, whereupon registration is performed.

In other words, because game terminal device information is supplied by all of the game servers and registration is performed in the authentication server, integrated management of information regarding the game terminal devices is made possible.

This information is information that identifies any game terminal device that has performed a bad act that may result in denial of access authentication to the game servers.

Denial of access authentication to the game servers is determined based on the seriousness of the bad act, and this determination may be subject to conditions involving the period or the types of games for which access authentication is denied.

For example, the determination may impose denial of access authentication for a specified time such as one month or one year, denial of access to a particular game server, or other conditions.

The present invention also provides a network game system in which a plurality of game terminal devices are connected to each other so that each game terminal device is capable of executing a specified game application program, and the network game system is characterised in that each game terminal device has a control means that can exchange player personal introduction information with other game terminal devices.

For example, this control means is constructed such that it can transmit a request to exchange personal information to another terminal, determine whether or not to accept such a request to exchange personal information, and transmit the results of this determination to the other terminal, as well as, when an input accepting the request to exchange personal information is made, carry out the exchange of personal information and save the exchanged data, while not carrying out the exchange if an input denying the exchange request is made.

In this case, the personal information comprises data displayed in the form of a virtual business card, for example. This display data in the form of a card may comprise data pertaining to the games played by the particular player. Furthermore, the data displayed in the form of a card may, for example, be stored in the memory area of the game application on each terminal, with the individual parts that form a character each being assigned a code. When this occurs, the data displayed in the form of a card may be transmitted over the communication network as codes for characters selected for the displayed data.

In each of the constructions described above, the terminal may also be constructed as a game machine that can execute its own online game application.

At the same time, in the construction in which the personal information comprises display data in the form of a card, this system may have a means that changes the data regarding the format of the card in response to the number of times personal information is changed. In this case, the data regarding the format of the card consists of at least one of the following: the color of the card, the motion of the character on the card, the background behind the character, or the card's name.

Furthermore, in the construction in which the personal information comprises display data in the form of a virtual card, the personal information may include the player's e-mail address attached to the display data in the form of a card.

In addition, in the basic construction described above, the game parent station may also have a tournament server means that executes the online game application in a tournament format, a determining means that determines which players have violated prescribed rules governing the execution of the online game application, and a sanctioning means that, the next time a player that has violated the rules attempts to join the tournament, issues a warning regarding the violation or imposes the sanction of preventing the player from connecting to the tournament server means.

Where a construction that includes sanctions for violations is adopted, the determining means and the sanctioning means are constructed as part of the tournament server means, for example. The determining means and the sanctioning means may also be constructed as part of the online game application.

On the other hand, the storage medium pertaining to the present invention is a storage medium that allows the online game application to be realized on the terminal.

Another game system pertaining to the present invention is a game system in which a plurality of terminals are connected to a game supply station over a communication network, and in which the online game application may be realized on the terminals by means of this game supply station, wherein each terminal has a personal information processing means that can exchange personal information between players when the online game application is executed between the plurality of terminals, and this personal information processing means is characterised in that it has a first processing means that can transmit to another terminal an exchange request indicating a desire to exchange personal information, and a second processing means that can (i) send to the other terminal the result of its determination whether or not to accept the exchange request indicating a desire to exchange personal information, (ii) where input that the personal information exchange request was accepted is made, carry out the exchange of personal information and save the exchanged data, and (iii) where input denying the exchange request is made, refrain from carrying out the exchange.

The present invention provides an online game system in which terminal devices are connected to servers over a network, and which is characterised in that the terminal devices have a control means that executes the game program in parallel with the process of connecting to the servers.

These terminal devices read out both the game program and a program indicating the process of connecting to the servers, while the control means begins the execution of the game program when the user instructs that the server connection process be initiated.

The terminal devices can also perform display on a display device in accordance with the execution of the game program, as well as perform display of the state of connection to the servers.

The terminal devices can execute the game program until the connection to the servers is terminated, or until it is detected that connection to the servers may not be performed.

The control means can also execute the game program until the connection to the servers is terminated, or until it is detected that connection to the servers may not be performed.

The plurality of game terminal devices in the present invention are characterised in that they are provided with an extra game program that has no connection to the game application program, and executes during the interval required for the game terminal device to connect to the game parent station over the network.

In other words, because it takes a certain amount of time (about five minutes) to connect to the network, players can become tired of watching still images on their screens during this period. Therefore, if an extra game is run which allows the player to perform some movement or carry out some action on the screen through operation of the game equipment during this network connection interval, the player can become absorbed in this game and the time spent waiting can be more enjoyable.

It is preferred that this game comprise a very simple minigame that does not extend the time required to connect to the network. In other words, because the extra game is played during the network connection process, if it were a complex game, the time required to connect to the network would increase, and consequently it is preferred from a time allocation standpoint that game system spend a larger percentage of its time connecting to the network.

In addition, by displaying the fact that the network connection process is underway while the extra game is running, the user can enjoy the extra game without concern.

Furthermore, the extra game can proceed continuously even where the player does not operate the game equipment. Considering the fact that some players will not play the extra game, in which case ending the game would be pointless, if the game is made to continue even if the player does not use the game equipment, the screen will remain dynamic during the network connection process, making it at least more enjoyable to watch than still images.

BRIEF DESCRIPTION OF THE DRAWINGS

FIG. 15 is a table showing one example of the 'Number of Encounters and Evaluations Table' which shows a first variation.

BEST MODE FOR CARRYING OUT THE INVENTION

Embodiments of the present invention will be explained below with reference to the attached drawings.

(System Construction)

The construction of the system by which to access the game server 77 (equivalent to the game parent station 7 described below (see FIG. 1)) from a specific game device 1 will now be explained with reference to FIG. 29.

First, the specific game device 1 must perform initial registration. After initial registration, it must be determined whether or not access authentication may be granted, based on whether or not the game device 1 has a history of bad acts in the game server 77 connected to the network system.

Figure 29:
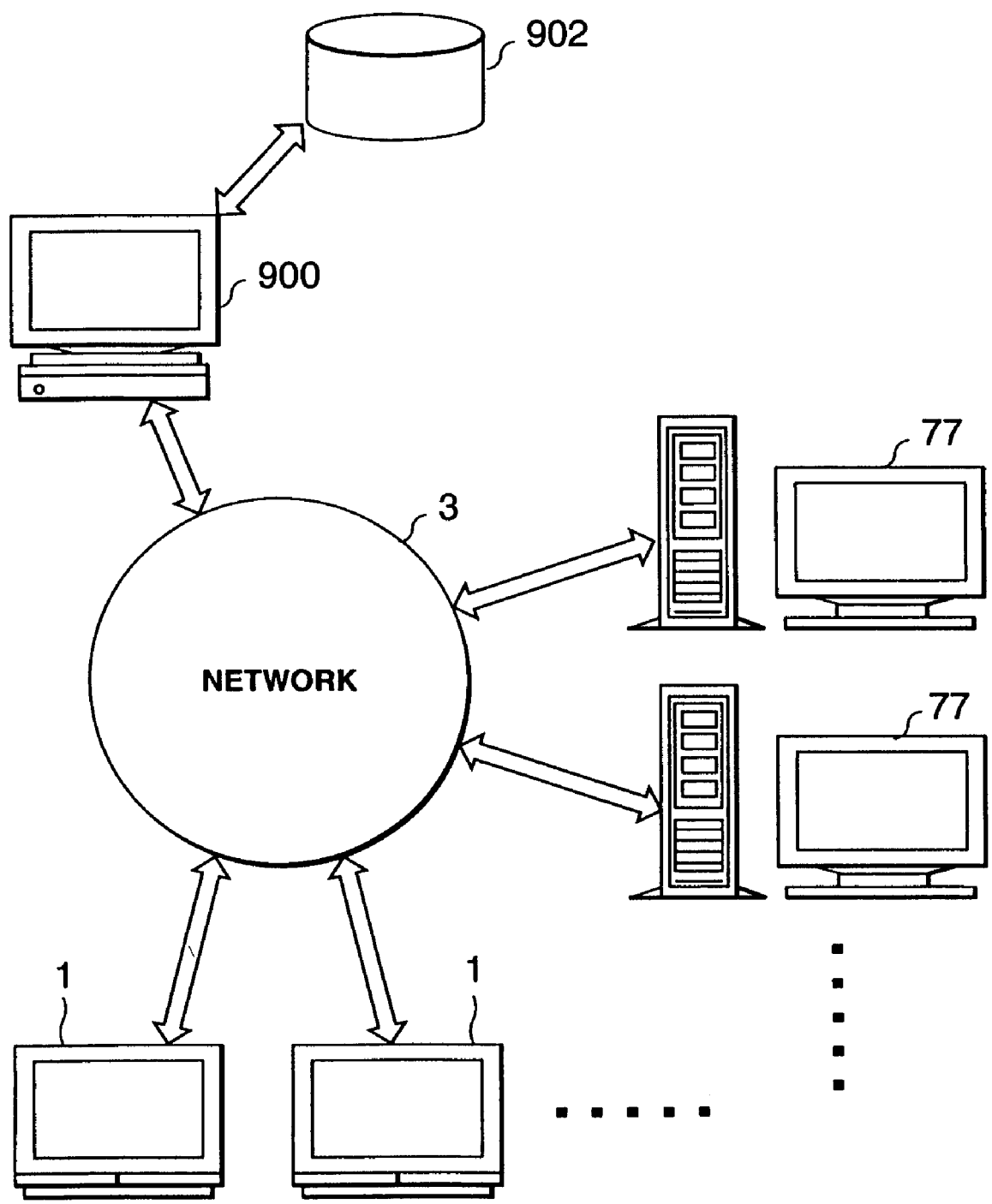
FIG. 29 is a system construction diagram showing the basic construction of the network system, particularly where a single authentication server is used for a plurality of game servers.

As shown in FIG. 29, the game device 1 is connected to the network 3, and this game device is permitted to access a specified game server 77 connected to the network 3 and execute the network game. While there is only one game server 77 in this example, other game servers 77 may be connected to the network 3. Naturally, the number of game devices 1 is not limited to the number shown in the drawing, and many game devices 1 may be connected to the network.

An authentication server 900 is connected to the network 3. This authentication server 900 is a common authentication server 900 that serves a plurality of game servers 77. In other words, each game server 77 does not have its own authentication server. Information regarding the game device 1 based on the execution of the game application programs on each of the plurality of game servers 77 is registered in the database 902 of the authentication server 900 by the game servers 77. The most important of this information is the information regarding the commission of bad acts by the game device 1, based on which determinations are made regarding whether future access is authorized.

The determination of the 'badness' of a particular act varies depending on each game server 77. The determination may be made and transmitted automatically, or it may be made by the administrator of the game server 77 and transmitted by means of an input operation.

As described above, the operations executed on the authentication server 900 consist of the initial registration of the user (i.e., the game device 1), and the determination of whether or not the user (game device 1) accessing the game server should be authorized for access (i.e., whether or not access permission should be granted).

Figure 30:
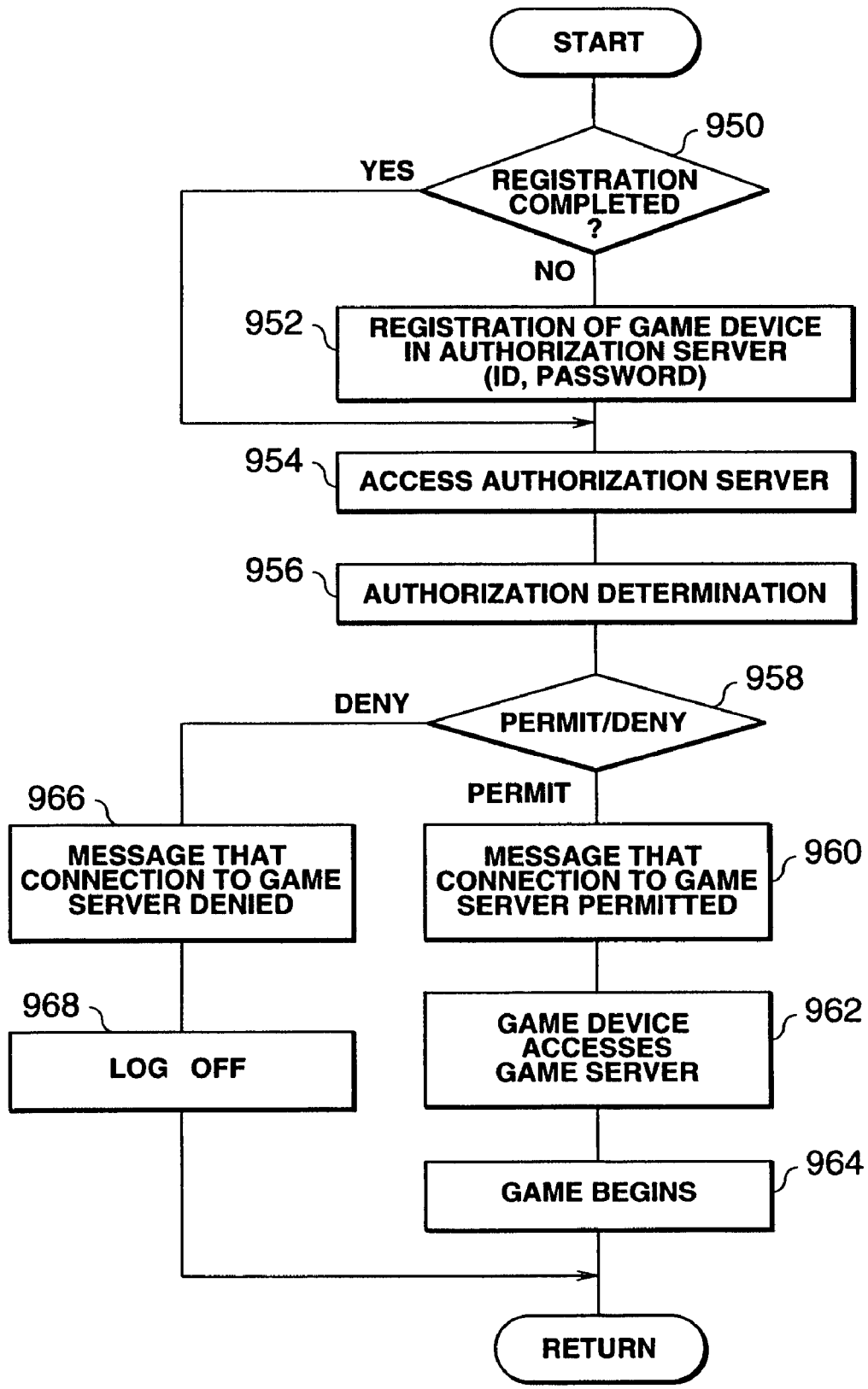
FIG. 30 is a flow chart of the control performed to determine whether access authentication is granted or denied in the system having the construction shown in FIG. 29.

The process by which a game device 1 is granted or denied access by the authentication server 900 will now be explained with reference to FIG. 30.

First, in step 950, it is determined whether or not registration has already been performed. If registration is determined not to have already been performed, the authentication server 900 advances to step 952, in which the process of registering with the authentication server 900 is executed using the registration program incorporated in the game device 1, and the authentication server 900 then advances to step 954. In the event of an affirmative determination in step 950, that is, where registration has already been performed, step 952 is skipped, and the authentication server 900 advances to step 954.

In step 954, the authentication server is accessed. During this access, the user ID and password must be input.

In the subsequent step, step 956, an authentication determination is made. This authentication determination is based on information provided by the plurality of game servers 77 to the database 902 that the user is a bad user, and in addition to determining whether or not connection to the network 3 will be permitted, such a determination also decides the conditions to be applied in the event permission is denied. These conditions include the denial of permission for a limited time, the granting of access to some game servers 77 while denying access to others based on the nature of the bad acts committed, the display of information on the game terminal device that the user may be deemed a bad user, or the blanket denial of access to the game servers.

In the next step, step 958, where the authentication determination is that access permission is granted (including cases in which access is granted to only some of the game servers 77), the authentication server 900 advances to step 960, in which a message is transmitted stating that connection to the game servers 77 is permitted, and then to step 962, in which connection to the desired game server 77 is carried out, and the game finally begins to be played in step 964.

Where it is determined in step 958 that access is denied (including denial for a limited time), the authentication server 900 advances to step 966, in which a message is transmitted stating that connection to the game servers 77 is denied, and then to step 968, in which the logoff process is executed.

As described above, because when a game device 1 accesses the game servers 77, it is first required that the game device 1 access the common authentication server 900 rather than the plurality of game servers 77, and new registration is thereafter performed, or if the game device 1 has already been registered, it is determined on this authentication server 900 whether or not the user is permitted to join the network 3 based on information supplied by each game server 77, bad acts committed on the game servers 77 may be managed in an integrated fashion, and users that commit bad acts on any of the game servers 77 can be prohibited from accessing other game servers 77.

Because this construction does not require the installation of any additional authentication servers 900 even if the number of game servers 77 is increased, the system construction may be simplified.

Moreover, because the various items of information in the game servers 77 may be managed in an integrated fashion, it becomes easy to identify bad users (or game devices 1). As a result, the system may have the effect of inhibiting the commission of bad acts.

First Embodiment

Figure 1:
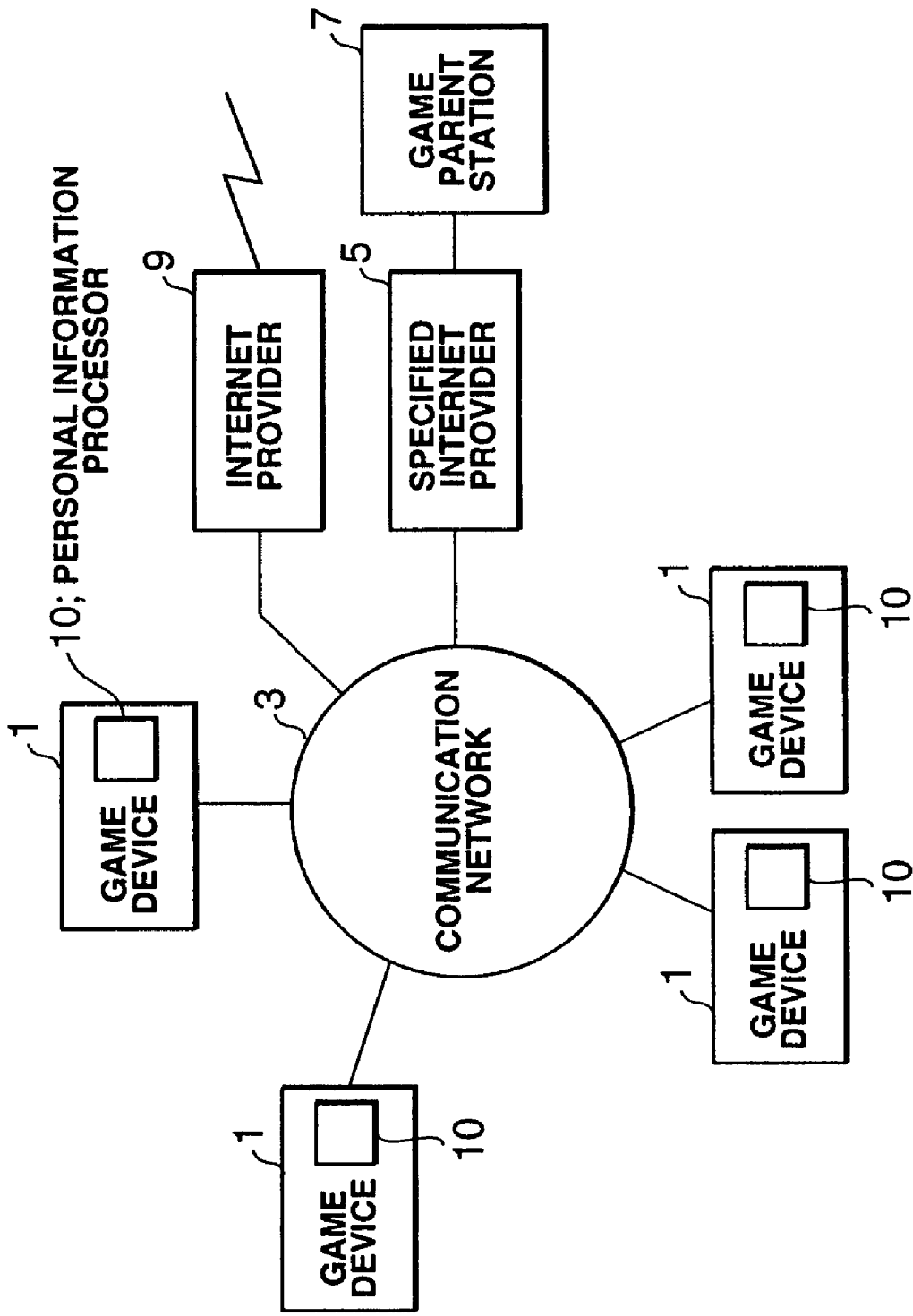
FIG. 1 is a block diagram showing the overall construction of the game system pertaining to a first embodiment of the present invention.

A first embodiment will now be explained with reference to FIGS. 1 through 10. As shown in FIG. 1, in this system construction, a common game application program is executed on a plurality of game devices.

The first embodiment will now be explained with reference to FIGS. 1 through 10. FIG. 1 is a block diagram showing the functions of the network game system pertaining to the present invention. In this system, a common game application program is executed on a plurality of game devices.

In FIG. 1, the system comprises a plurality of terminal devices 1 that comprise video game machines, a game parent station 7 that includes a plurality of server machines, and a communication network 3 that connects the game devices and the game parent station. In this system, the terminal devices are connected to the game parent station 7 via a specified Internet provider 5 that is designated in order to execute a particular game, and the common game application program is executed on a plurality of game devices (terminal devices) 1 through the game parent station 7. The game devices 1 may also be connected to the server machines through the network 3 and an Internet provider 9 that is not a specified Internet provider.

In this system, each game device 1 incorporates a personal information processing means 10 that can exchange detailed personal information regarding each individual user when the game application program is executed.

Figure 2:
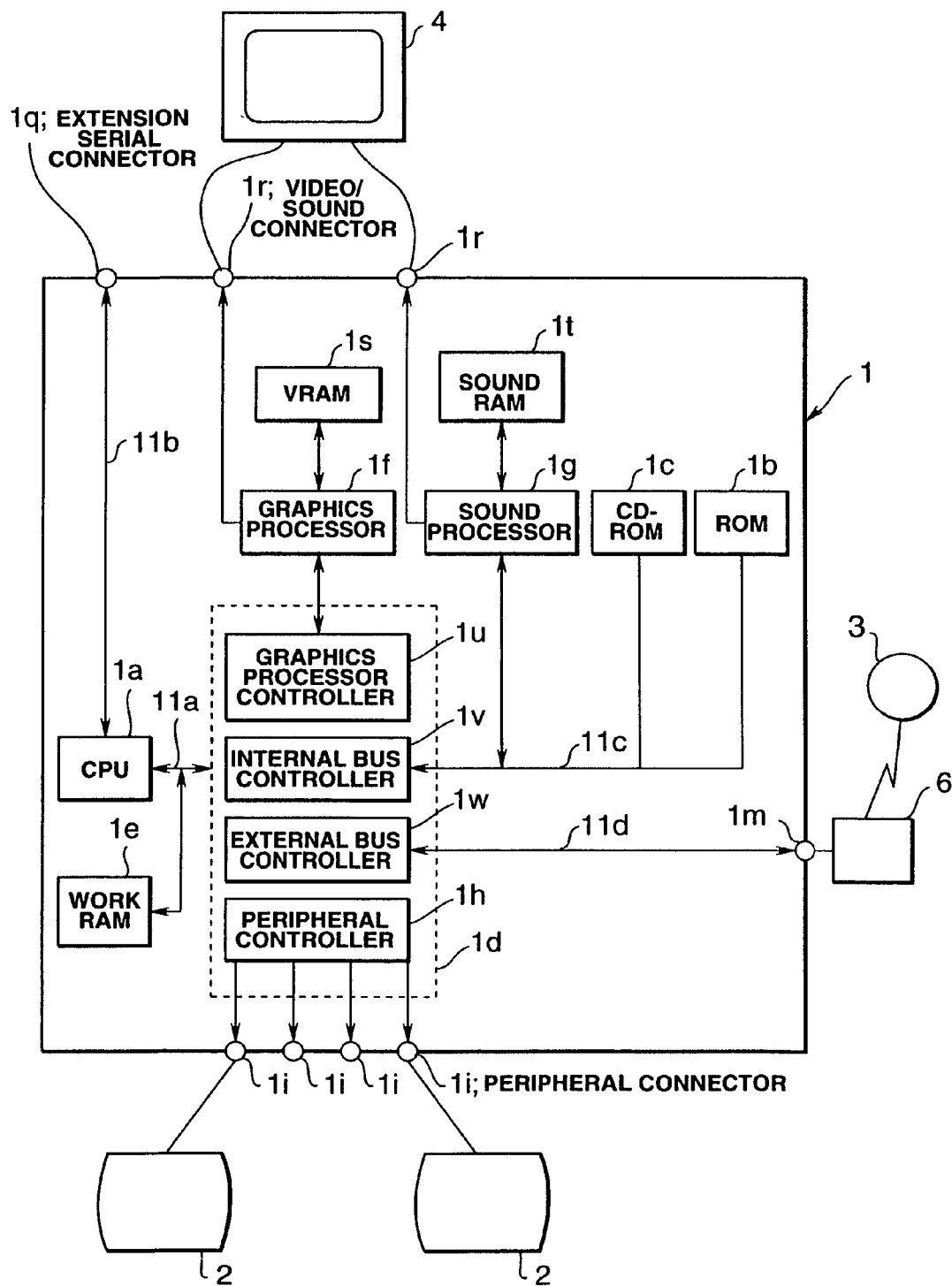
FIG. 2 is a block diagram showing a game device used in this system.

FIG. 2 is a function block diagram that explains the construction of the game device. In FIG. 2, the game device 1 comprises a CPU 1a that serves as a processing device to execute the game application program and other control programs, a ROM 1b that stores as the control programs, for example, program codes to interpret macros or scenario macros, program codes to perform processing in accordance with abstract operation commands, and other data or operating systems necessary to process the game program, a CD-ROM device 1c that includes a CD-ROM that stores data such as graphics including dynamic images, text, or other information, as well as a game application program that runs a specified game based thereon, a bus controller 1d that controls the flow of data between the CPU 1a and the various other components, a RAM 1e used for data processing, a graphics processor 1*f* that forms image signals from graphics data, and a sound processor 1*g* that forms sound signals from sound data.

A VRAM 1*s* is connected to the graphics processor 1*f*, and is used when graphics signals are formed. A VRAM it is connected to the sound processor 1*g*, and is used when sound signals are formed. The output unit of the sound processor 1*g* is connected to an audio/video connector 1*r*.

The bus controller 1*d* roughly comprises a peripheral interface 1*h*, a graphics processor controller 1*u*, an internal bus controller 1*v*, and an external bus controller 1*w*.

The bus controller 1*d* is connected to the CPU 1*a* via the bus 11*a*, and the CPU 1*a* controls the bus controller 1*d*. The RAM 1*e* is also connected to the bus 11*a*. An extension serial connector 1*q* is connected to the CPU 1*a* via the bus 11*b*, and the CPU 1*a* can use or control serial connection-based accessory devices connected to the extension serial connector 1*q* by exchanging signals with them based on a prescribed data transfer method. In other words, serial connection-based accessory devices may be connected to the game device 1, and program, image, sound, command or other signals may be exchanged between the accessory device and the game device 1.

The graphics processor controller 1*u* can control the graphics processor if under the control of the CPU 1*a*. The CD-ROM device 1*c*, the ROM 1*b* and the sound processor 1*g* are connected to the internal bus controller 1*v* via the bus 11*c*, and the internal bus controller 1*v* can control the CD-ROM device 1*c*, the ROM 1*b* and the sound processor 1*g* under the control of the CPU 1*a*.

The output unit of the external bus controller 1*w* is connected to the extension connector 1*m* via the bus 11*d*, and this expansion bus controller 1*w* can use or control serial connection-based accessory devices connected to the extension serial connector 1*m* under the control of the CPU 1*a* by exchanging signals with the serial connection-based accessory devices. In other words, the serial connection-based accessory devices can be connected to the game device 1, and program, image, sound, command or other signals may be exchanged between the accessory device and the game device 1.

Peripheral devices 2 are connected to the peripheral interface 1*i*. A video monitor 4 is connected to the audio/video connector 1*r*.

A cable modem 6 is connected to the extension connector 1*m* as a parallel-connection based accessory device, and the game device is connected to the network 3 via the cable modem 6.

In addition to the cable modem 6, a terminal adapter, satellite data receiver, portable terminal device (PDA), cellular telephone, data recording device, or other parallel-connection based accessory device may be connected to the expansion bus 1*m*.

A PHS, data-recording device, communication cable or other serial connection-based accessory device may be connected to the extension connector 1*r*.

Figure 3:
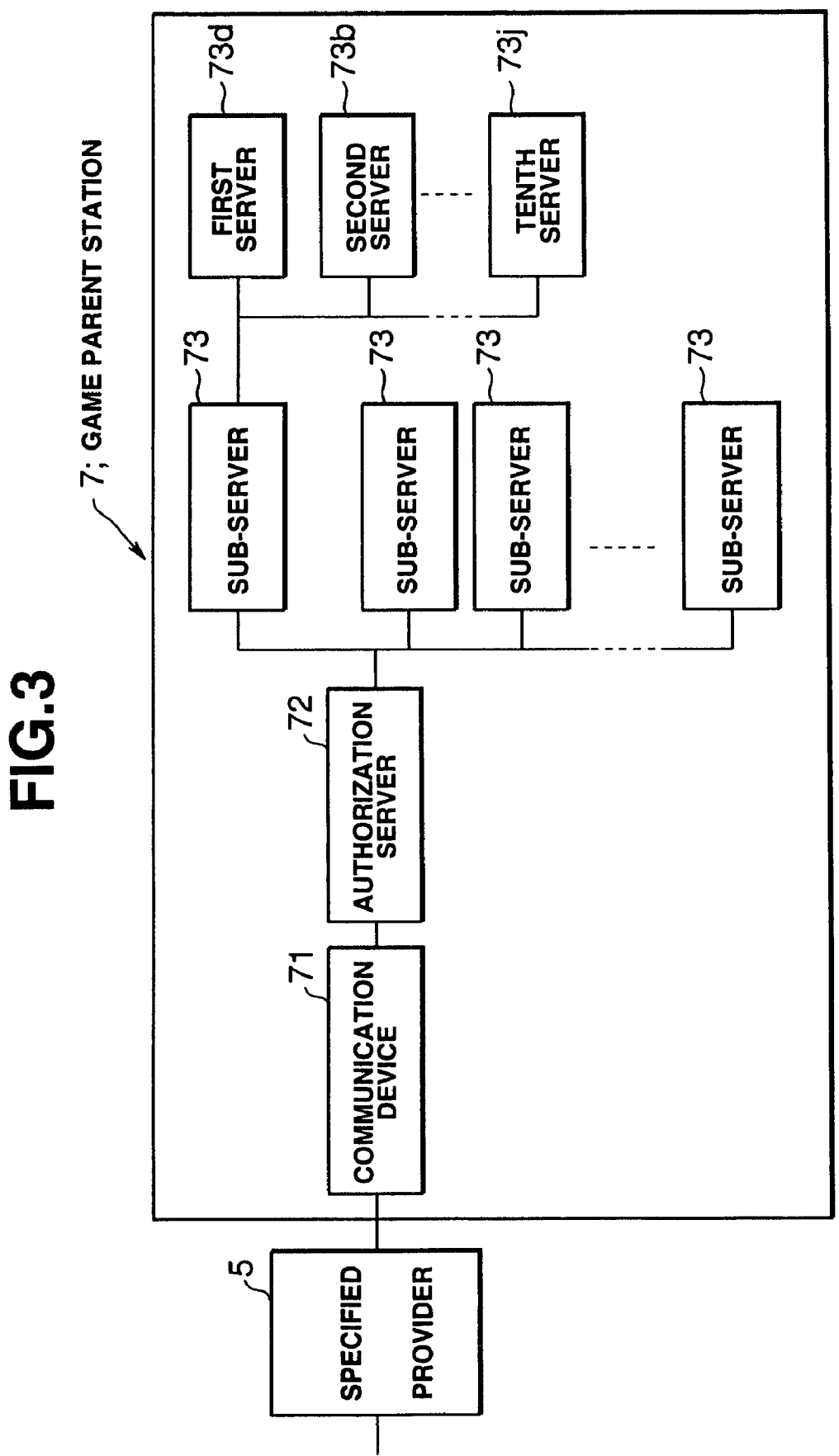
FIG. 3 is a block diagram showing the construction of a game parent station used in this system.

FIG. 3 is a block diagram showing the construction of the game parent station. In FIG. 3, the game parent station 7 comprises a communication device 71 that carries out communication with the game devices via the network 3 and a specified Internet provider 5, an authentication server that is connected to the communication device 71 and functions as a general server to control sign-ups and connection requests from the game devices 1, and specified servers (sub-servers) 73 that are subordinate to the authentication server 72 and perform processing to realize a virtual experience on the game device 1 in which the player feels as if he were playing an athletic game such as ping-pong or a game such as mahjongg in a resort hotel, etc., for example. Here, the sub-servers 73 comprise a first server 73*a*, a second server 73*b*, and so on, up to a tenth server 73*j*. The sub-servers 73 have a control means to run in each game device a specific online game.

This system enables the realization of a tournament-format game environment among the game devices. Each player can, for example, participate in a tournament-type game and receive a game ranking. A tournament format means that there is a game space subject to prescribed rules, and particularly, that any player may participate, that the game is a competitive game, and that players may freely decide whether or not to participate.

Figure 26:
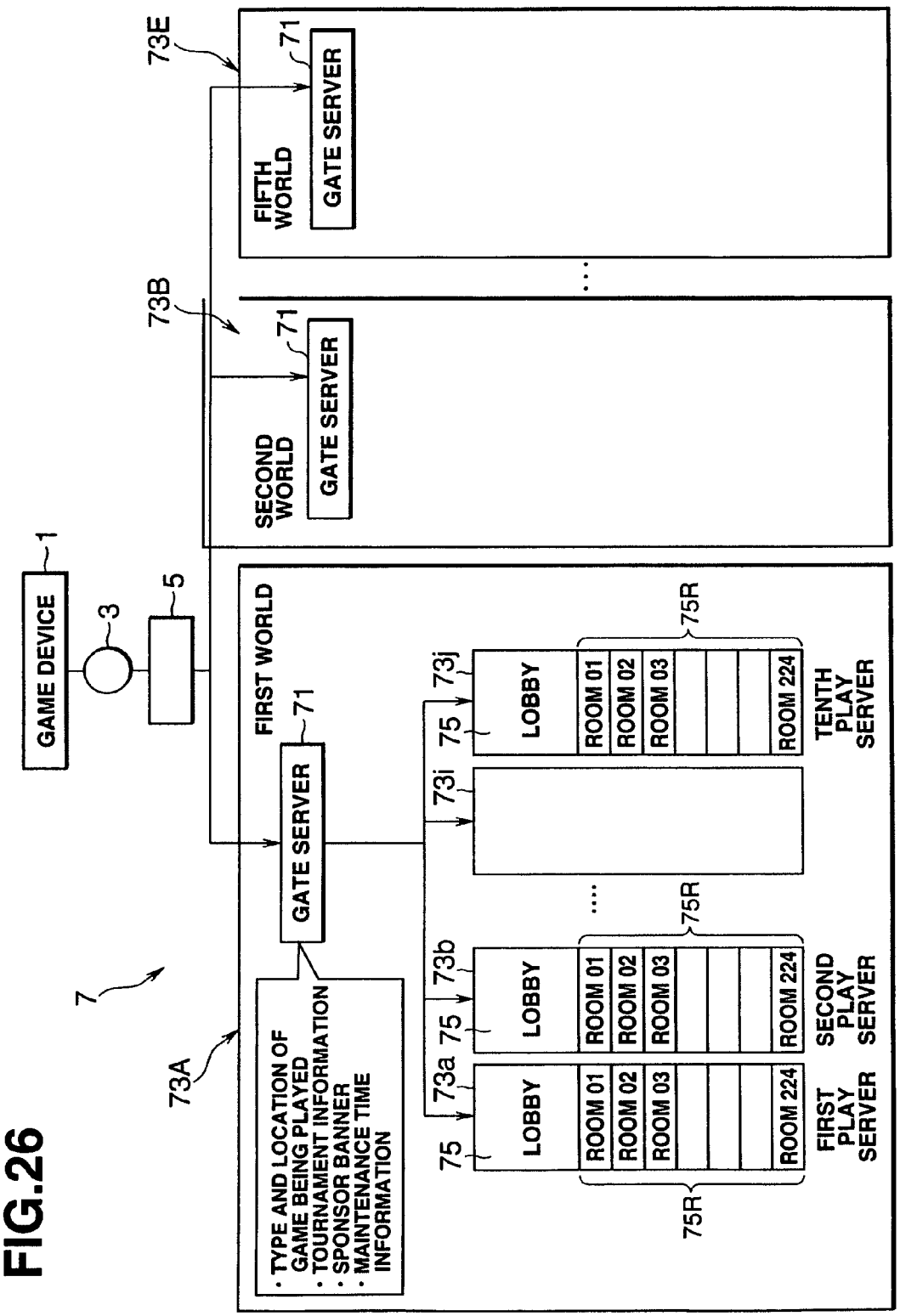
FIG. 26 is a block diagram explaining in detail the state in which a game device is connected to a game parent station by means of an Internet service provider, as well as details regarding the station's specified servers (worlds).

FIG. 26 is a block diagram showing the situation in which a game device 1 is connected to sub-servers via an Internet provider 9, a network 3 and a specified Internet provider 5, respectively.

The sub-servers 73 are called 'worlds' in FIG. 26, and comprise five worlds, from a first world 73A to a fifth world 73E. Because each world has the same construction, the construction of the worlds will be explained in detail below using only the first world 73A as an example.

Players authorized by the authentication server 72 are notified by the gate server 71 of such information as the type of game that is played in the first world 73A, tournament information, sponsors and maintenance times.

The gate server 71 comprises the first server (first play server) 73*a*, the second server (second play server) 73*b*, and so on, up to the tenth server (tenth play server) 73*j*. Because each play server has the same construction, the internal construction of the play servers will be explained below using only the first server (first play server) 73*a* as an example.

When a player's terminal device is connected to the first server 73*a*, the server's environment is provided to the player's terminal device. In other words, the player first enters a space resembling the lobby 75 of a resort hotel. A memory area corresponding to this lobby exists in this server.

Next, by making a selection after receiving reports from the gate server 71, the player can enter the selected room in the memory area of the first server 73*a*. The lobby 75 is a so-called waiting room, and players may select their playing room (from the first room 75R through the 224$^{th}$ room 75R) from the lobby 75.

Each play server is assigned play rooms such as fortune-telling rooms, chess rooms, card game rooms, or mah-jongg rooms. Each room in a special play server is a play room dedicated to a designated game, such as mah-jongg, and each room has a maximum occupancy. The player can enter a desired room if the maximum occupancy has not been reached, but cannot enter if the maximum occupancy has been reached. A player entering a play room can play an online game such as mah-jongg with other players that have already entered the room. The player selects which world to enter.

Figure 27:
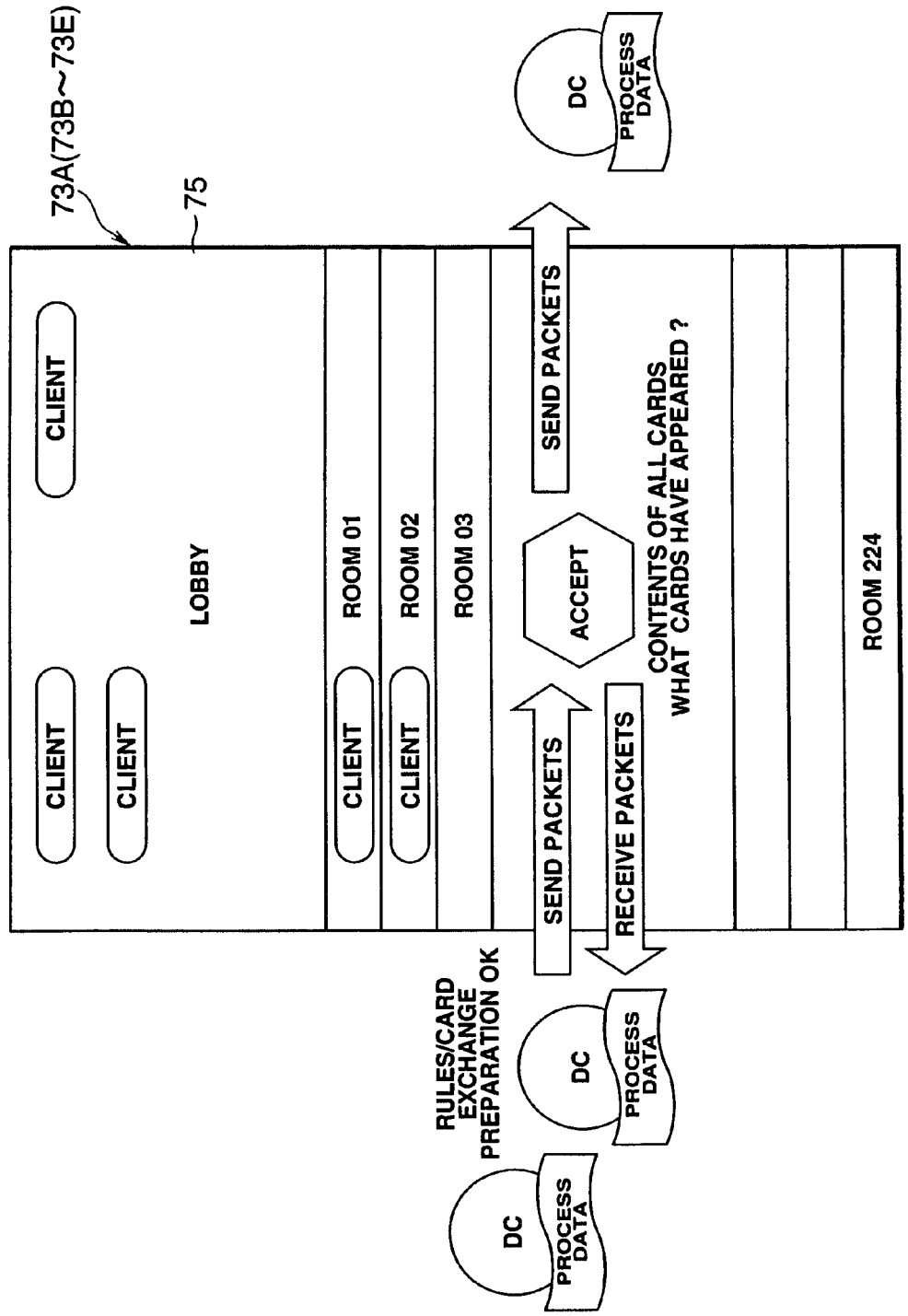
FIG. 27 is a block diagram to explain the state in which a play server client has entered a room, as well as the form of communication (packet communication).

FIG. 27 shows the state of entry into the world 73A (or worlds 73B to 73E) by clients (game terminal devices or players) of each play server (the first server through the tenth server). It shows a situation in which three clients in the lobby 75 have completed their network connection, and are at the stage of deciding which game to select. Meanwhile, the clients that have entered a room (in FIG. 27, rooms 01 or 02) can play the game offered in that room.

As shown in FIG. 27, communication is possible between each of the game devices 1*a*, 1*b* and 1*c* owned by a plurality of clients that have entered the room (in FIG. 27, the room shown under room 03), with the play server 73*a* (or the servers 73*b* through 73*j*) at the center, and messages regarding rules (special rules established by the users), exchanges of cards, and notification of completion of game preparations are sent and received via packet transmission. This information is managed by all of the play servers 73A through 73J. For example, if the room is a room in which card games are played, the play server 73A manages the cards that were initially dealt to all players, or the cards that have been dealt during the game, in an integrated fashion.

The operation of the game system will now be explained. In the explanation of the operation of this game system, the operation that takes place when the game terminal is connected to the game parent station and the game is begun will first be explained, and the operation that takes place when the personal information regarding the players that operate the game devices is exchanged among the players will then be explained.

[Connection and Game Play Between Game Device 1 and Game Parent Station 7]

Figure 4:
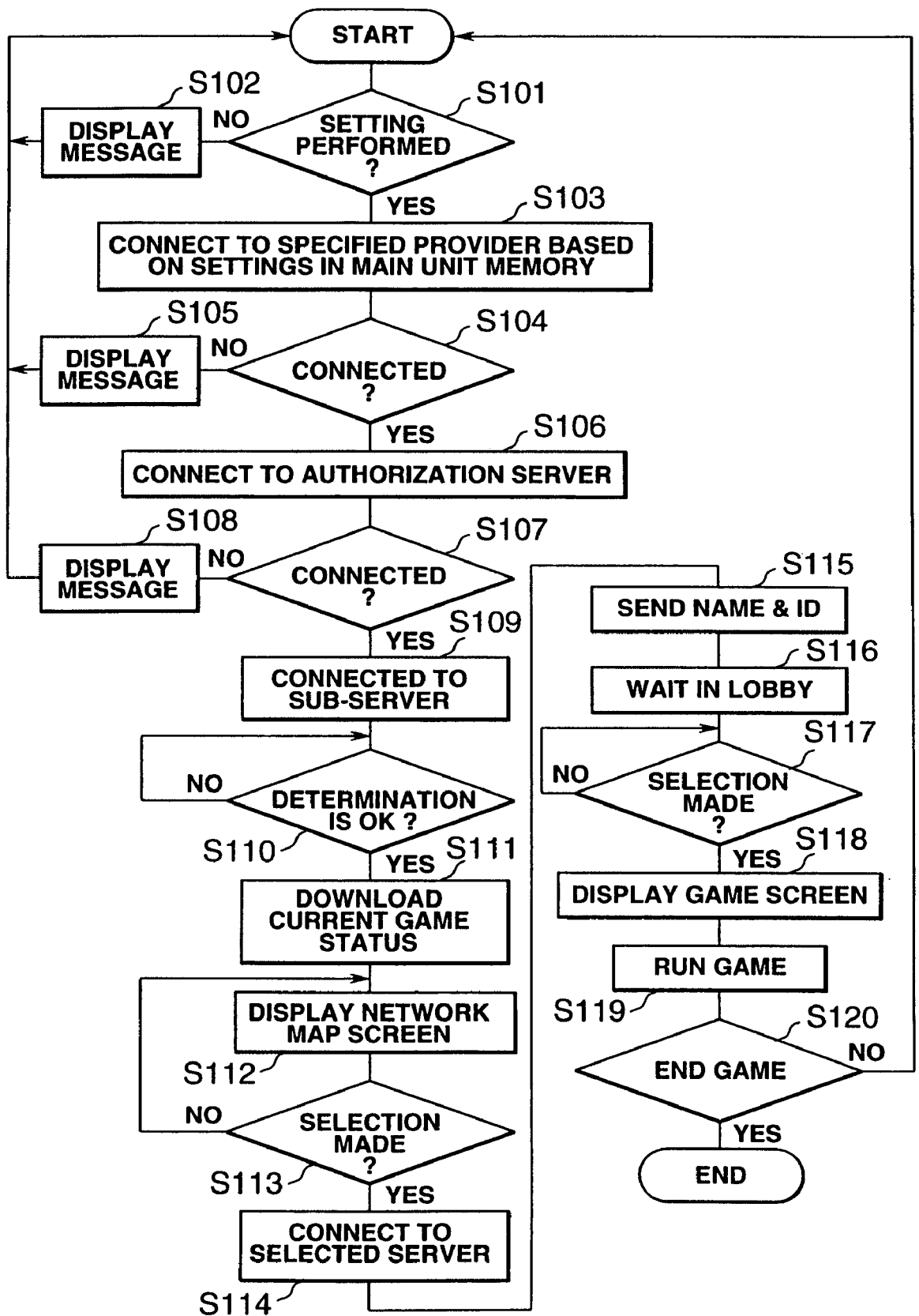
FIG. 4 is a flow chart to explain the operation to connect the game device and the game parent station in this game system, as well as the operation when the game is played after the connection is made.
Figure 5:
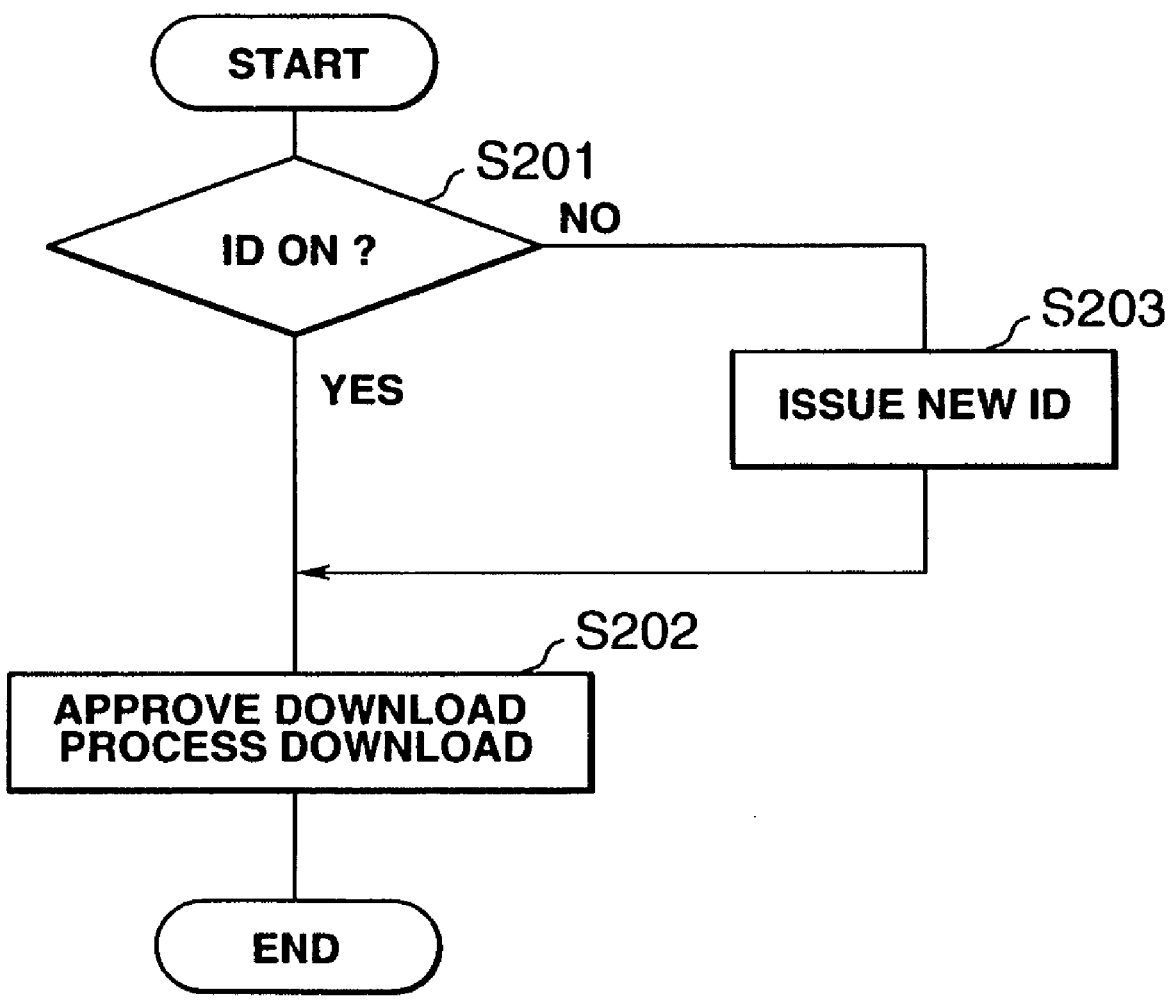
FIG. 5 is a flow chart of the process of the sub-servers in this system.
Figure 6:
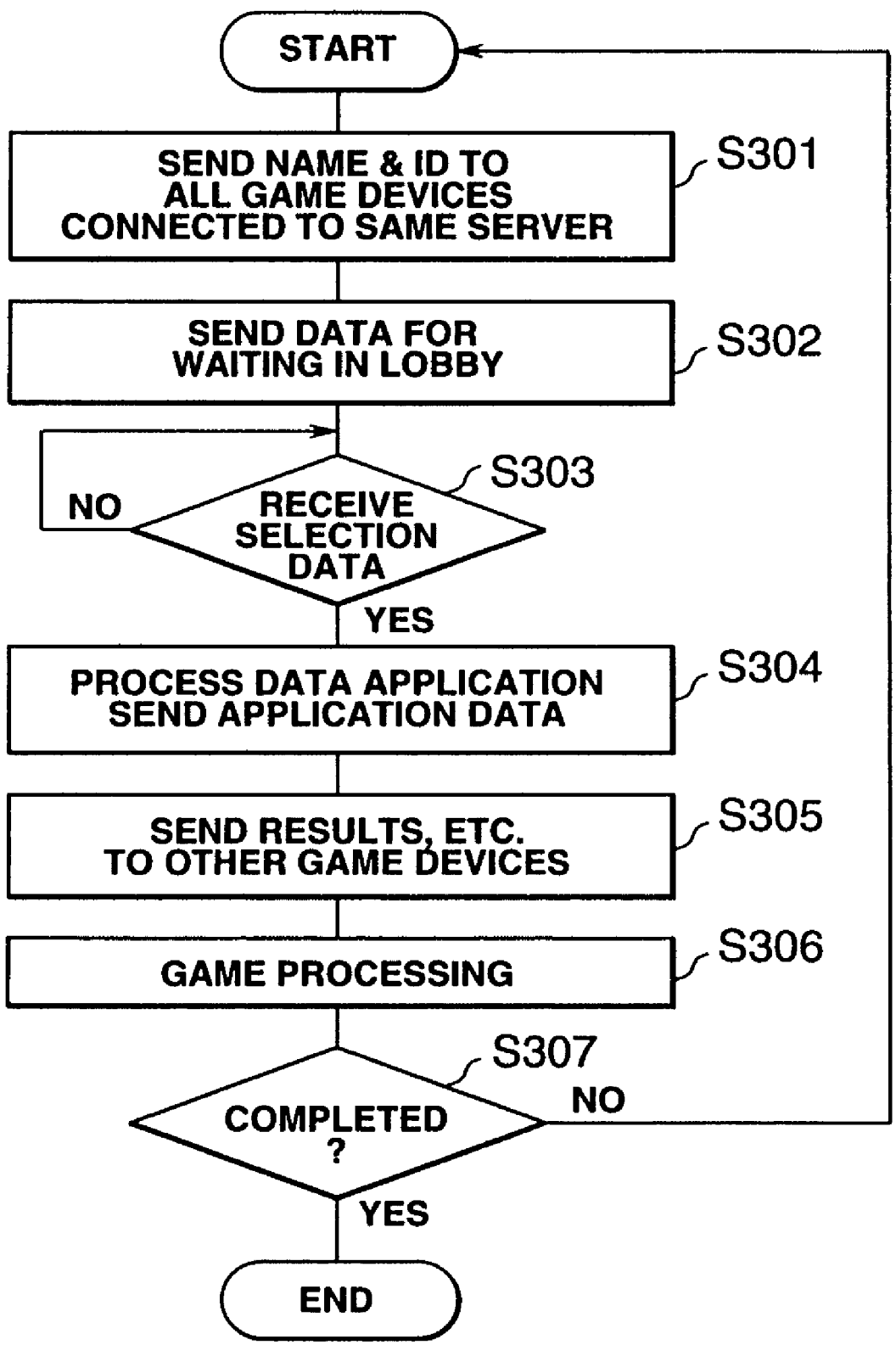
FIG. 6 is a flow chart of the process of the first through tenth servers in this system.

FIG. 4 is a flow chart to explain the operation to connect the game terminal and the game parent station, as well as the operation of the game that is run by the game terminals after the connection is made. FIG. 5 is a flow chart of the processing performed by the sub-servers. FIG. 6 is a flow chart of the processing performed by the first through tenth servers.

When the player makes settings for the connection of the game device 1 to the sub-server 73, and inputs a request to connect to the sub-server 73 in the game device 1, the sequence shown in the flow chart of FIG. 4 begins. The game device 1 determines whether or not prescribed setting operations have been carried out in the game device (S101 in FIG. 4) If the game device 1 determines that the settings are insufficient (NO in S101), the message 'Settings are not complete.' appears on the video monitor 4 (S102), and the game device 1 waits until the settings are input once more.

If the game device 1 determines that the settings are correct (YES in S101), the game device 1 carries out the process of connecting to the specified Internet provider 5 in accordance with the connection procedure stored in the RAM 1e in the game device 1 (S103). The game device 1 then determines whether or not the connection has been made (S104), and if the connection has not been made (NO in S104), the message 'The network is congested.' is displayed on the video monitor 4 (S105), and the game device 1 returns to the beginning of the process shown in the flow chart.

Incidentally, the connection process of step S103 shown in FIG. 4 normally takes several minutes. Accordingly, in order to use this connection wait time productively, an extra game (mini-game) that the player can play is displayed on the screen.

The extra game execution control routine will now be explained with reference to FIG. 23. This routine begins based on a YES determination in step S101 in FIG. 4, and proceeds in tandem with the connection process of step S103 in FIG. 4. However, in order to ensure that the extra game may be played during the connection wait time, the extra game is a mini-game having simple rules.

Figure 23:
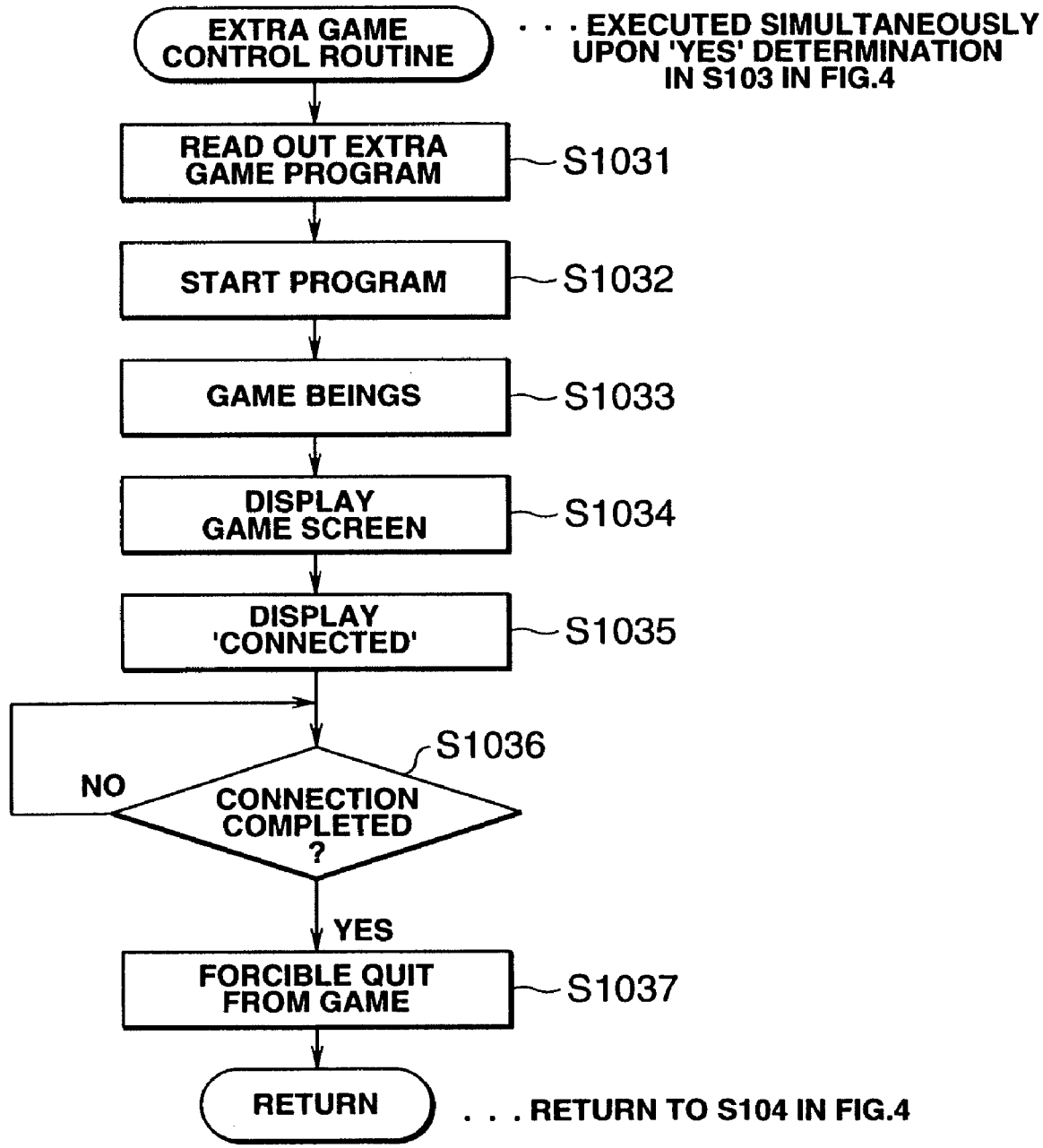
FIG. 23 is a flow chart showing the control routine followed during the connection to the server shown in FIG. 4.

As shown in FIG. 23, the game program is read out of the work RAM in step S1031 in tandem with the connection process. The read-out game program is then booted up (S1032) and the game is begun (S1033). The game screen then appears based on the commencement of the game (S1034).

Figure 24:
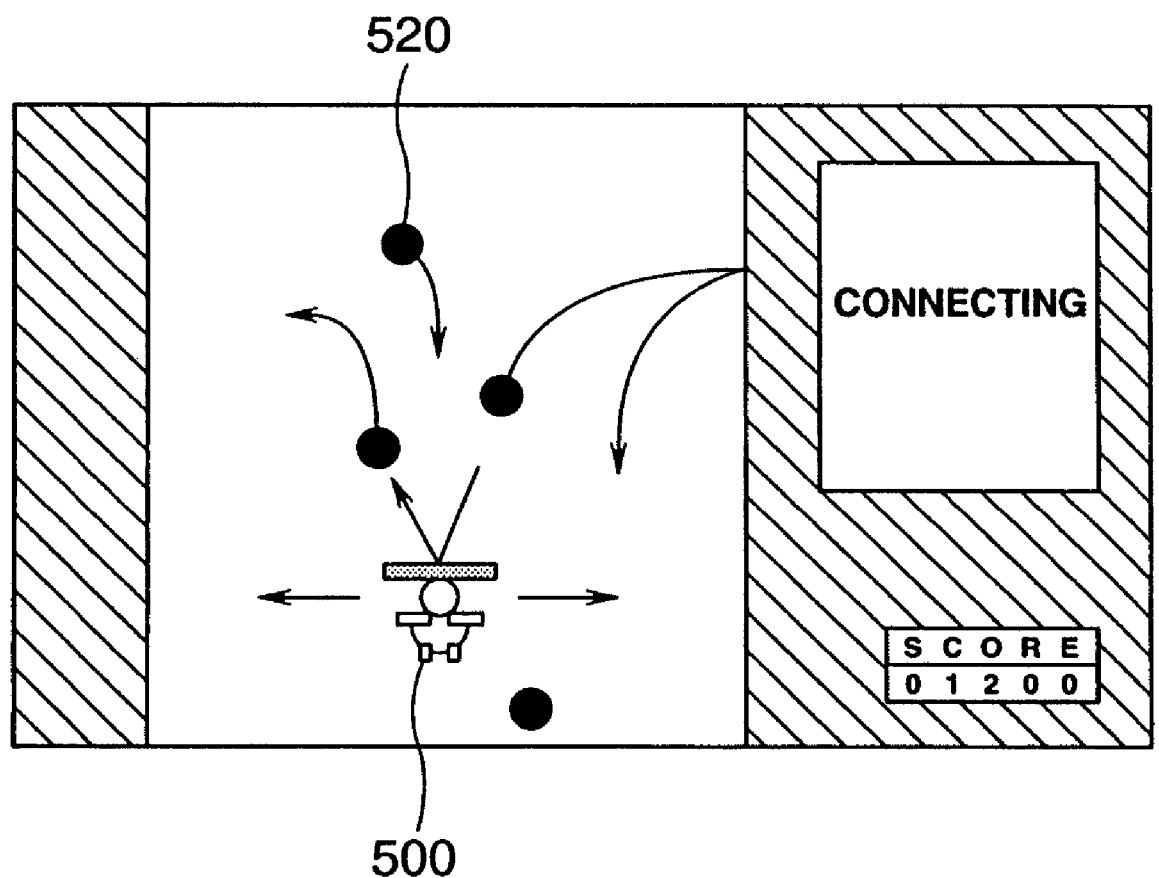
FIG. 24 is a front view showing one part of the extra game display screen.

As shown in FIG. 24, the extra game is a simple game in which the player tries to bounce back the obstacles 520 that bother the main object 500, and the player moves the main object to the left and right using the operating unit of the game device in order to bounce back the obstacles.

The current status of the connection to the provider is continuously displayed on the screen (for example, through the message 'Connecting . . . '), and the time elapsed since the commencement of the game is continuously displayed (S1035). The player can therefore know that the connection to the provider is being made and be aware of the elapsed time even when playing the game. The number of points scored is also displayed onscreen.

When the connection to the provider is either completed or fails (S1036), the game is forcibly terminated (S1037) even if the extra game is being played, and the game device 1 returns to the step S104 in FIG. 4. When this occurs, the 'Connecting . . . ' display changes to 'Connected'. On the other hand, where the connection attempt fails due to a busy signal or because the room is full, the message 'Connection failed' is displayed.

The extra game is not related to the main program explained below in connection with the first embodiment, and the points scored during this game are cleared when the game ends. The extra game may be designed to be appropriate to its status as a 'link' to the pending connection process. On the other hand, it is acceptable if the extra game is connected to the main game such that the points scored during the extra game are added to the points scored during the main game.

As shown in FIG. 4, when the connection is made to the Internet provider 5 (YES in S104), the game device 1 executes the process of connecting to the authentication server 72 (S106). It then determines whether or not the connection to the authentication server 72 is completed (S107). If the connection to the authentication server 72 is not completed (NO in S107), the message 'The amount of money is insufficient, or the settings are incorrect.' is displayed on the video monitor 4 of the game device (step S108 in FIG. 4), and the game device 1 returns to the beginning of the process shown in the flow chart.

If the connection to the authentication server 72 has been completed (YES in S107), the game device 1 executes the process of connecting to the sub-server 73 (step S109 in FIG. 4). The game device 1 then waits for the result of the determination made by the sub-server 73 regarding the game device ID (NO in S110 in FIG. 4).

As shown in FIG. 5, the sub-server 73 checks the ID sent by the game device 1, and if the ID is correct (step S201 in FIG. 5), the sub-server 73 approves the downloading of program data or necessary game data from the sub-server 73 to the game device (step S202 in FIG. 5), while if the ID is incorrect, the sub-server 73 issues a new ID and sends it to the game device 1 (step S203 in FIG. 5), and approves the downloading of data from the sub-server 73 to the game device (step S202 in FIG. 5).

Returning to FIG. 4, where the downloading of data from the sub-server 73 is approved (YES in S110 in FIG. 4), data regarding the status of the game running in the game system is downloaded (step S111 in FIG. 4). This data regarding the status of the game consists of information regarding the games being played in the servers 73a through 73j, as well as regarding the tournaments currently being played in the system. This data is displayed on each game device.

The game device 1 displays a network map on the video monitor 4 based on the downloaded data (S112), and waits for the player to select which of the games on the servers 73a through 73j will be played (NO in S113). When the player selects one of the servers among the servers 73a through 73j for connection (YES in S113), the game device 1 executes the process of connecting to that server 73x (x being any letter from a to j)(S114). The game device 1 then executes the process of transmitting the player's name and the ID assigned to the player to the server (S115).

In response, as shown in FIG. 6, the server 73x sends to all of the game devices 1 the names, etc., of all of the connected players using the game devices 1 connected to the server 73x (S301 in FIG. 6). Next, the server 73x sends to the game device 1 the data required to wait in the lobby (S302 in FIG. 6), and waits for a selection to be made from the game device 1 (NO in S303 in FIG. 6).

Figure 7:
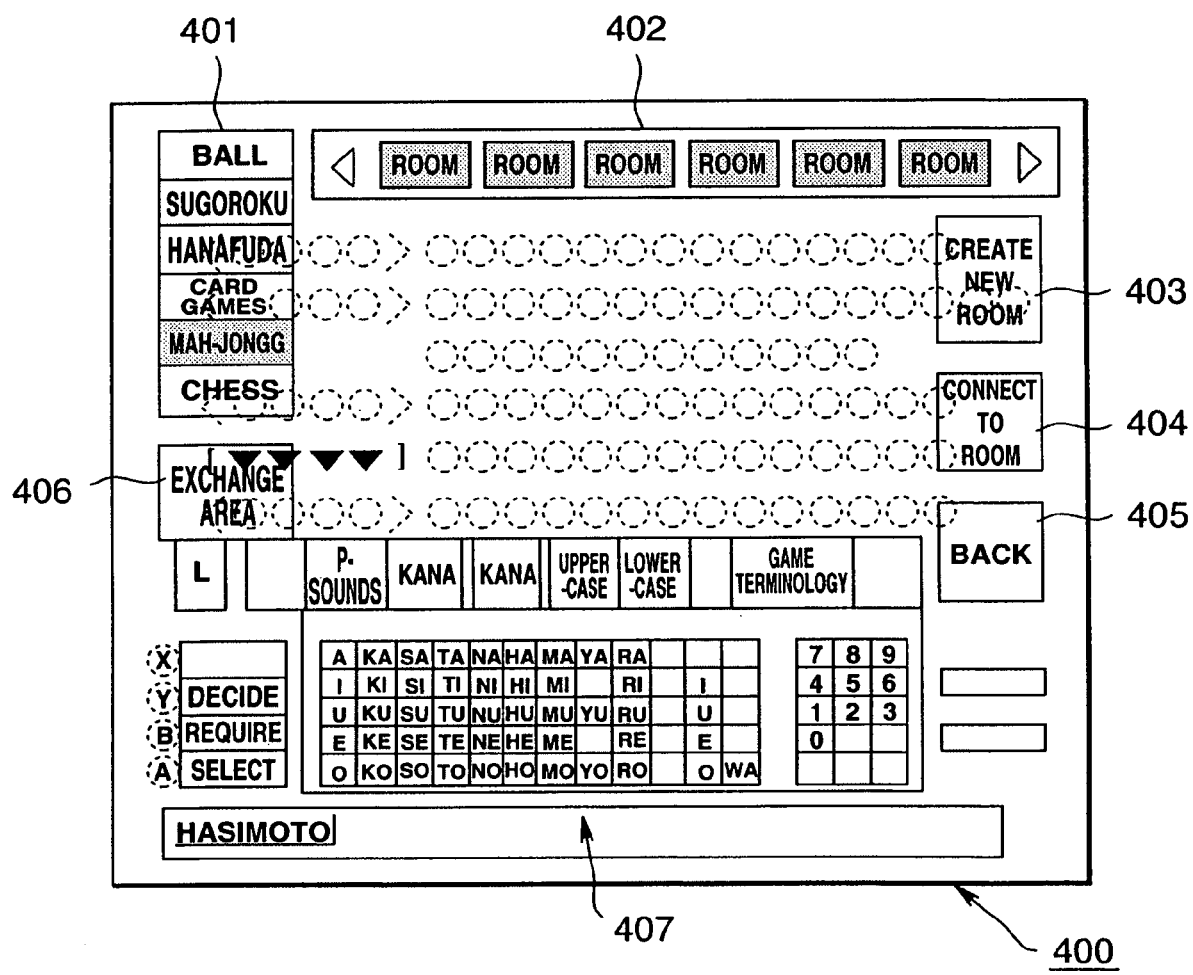
FIG. 7 is a drawing showing the network map screen that is displayed when the process of this system shown in the flow charts is underway.

Returning to FIG. 4, the game device 1 displays the network map 400 shown in FIG. 7 on the video monitor 4, based on the data from the server 73x (step S116 in FIG. 4). As shown in FIG. 7, the network map 400 comprises game contents 401 located at the left edge of the screen, room types 402 located at the top of the screen, a new room create command button 403 located at the right edge of the screen, a room connect button 404 located below the button 403, a 'Back' button 405 below the button 404, an exchange location designation button 406 at the lower left of the screen, and a keyboard display 407 located in the bottom third of the screen. The purposes of each of these components will be explained below.

The game device 1 then waits for a game to be selected based on this screen 400 (NO in S117 in FIG. 4). When the player inputs a game selection command to the game device 1, the game device 1 performs the process of transmitting the type and nature of the selected game to the server 73x (S118 in FIG. 4).

As shown in FIG. 6, when the server 73x thereby receives data regarding the selected game (YES in S304 in FIG. 6), the data required to execute the game application program is sent to the game device 1 (S304 in FIG. 6). The server 73x then receives the game data from the game device 1 and sends the data to the other game devices 1 connected to the same game application (S305 in FIG. 6), and manages the state of progress of the game application (S306 in FIG. 6).

As shown in FIG. 4, while connected to the server 73x, the game device 1 receives the data and programs required to process the game application, performs required processing, and finally proceeds with the game (S118 and S119 in FIG. 4).

In this way, in the game system, a network game may be run while the game devices 1 are connected to the authentication server 72, a sub-server 73 and a selected subsidiary server 73x, which is subordinate to the sub-server 73.

The communication protocol between the game terminals and the server will now be explained in detail using as an example the case in which three terminals—a terminal A, a terminal B and a terminal C—are used, with reference to FIG. 25.

The terminal A is operated by a player who is going to connected to the server to play a online game, the terminal B is operated by a player who has been connected and is now in the 'lobby', and the terminal C is a player who is already connected to a room (room 01) to which the terminal A would like to be connected.

Figure 25:
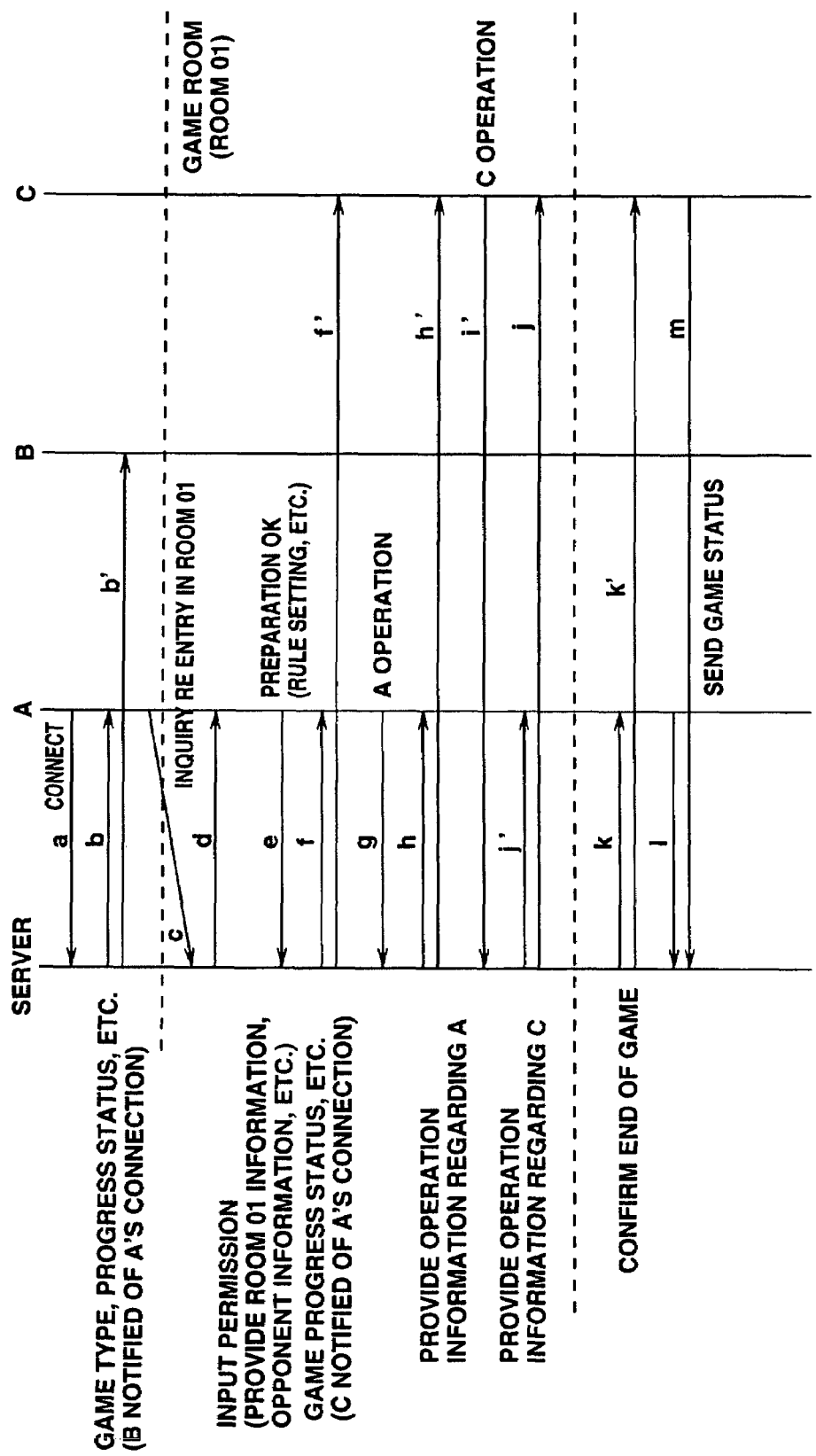
FIG. 25 is a drawing explaining the communication protocol used between the servers and the terminals, using terminals A, B and C as examples.

As shown in FIG. 25, first, the intention to connect is conveyed to the server by the terminal A (signal a).

In response to this signal a, after the connection is made, the types of games and the progress status are sent to the terminal A (signal b), and the terminal B is notified (signal b') of the fact that the terminal A is connected.

The terminal A immediately notifies the server of its desire to enter the room 01 (signal c). The server investigates the state of occupancy of the room 01 in response to this request, and if entry is possible, it issues an entry permission signal (signal d). When this occurs, the server provides to the terminal A, in addition to the entry permission, information regarding the room 01 and information regarding the other terminal (the terminal C) that has already entered the room 01.

The terminal A performs preparation (understanding of the rules, etc.) based on the information sent from the server, and sends a signal indicating that the preparation is completed (signal e). In response to this signal, the server informs the terminal A and the terminal C of the status of progress of the game (signals f and f', respectively). When this occurs, the signal f' transmitted to the terminal C includes a notification that the terminal A has entered the room.

When the game is thereafter commenced, a signal based on the operation of the terminal A is sent to the server (signal g), and based on this signal g, information on the operation of the terminal A is sent back to the terminal A (signal h), as well as to the terminal C (signal h').

Conversely, a signal based on the operation of the terminal C is sent to the server (signal i), and based on this signal i, information on the operation of the terminal C is sent back to the terminal C (signal j), as well as to the terminal A (signal j').

The game is played through repetition of these steps, and when the game ends, the server sends a game termination confirmation signal to the terminals A and C (signals k and k', respectively). In response, the terminal A sends the state of the game after termination (including the winner and loser) to the server (signal l), as does the terminal C (signal m).

[Creation of Card Format Data for Personal Information Exchange]

The game system described above is constructed such that each game device can exchange introductory information regarding the individual players. This personal introduction information includes data appropriate for introducing the individual player, including the player's name, date of birth, address, hobby, portrait, and past game results. The player need not necessarily indicate real private information such as his real name, address or date of birth. Alternatively, he may use false information that he creates, or may chose not to disclose such information. These information items are preferably arranged so that they are displayed on the game terminal device as a card object. In other words, in this network game system, the game control program executes a control process by which the personal introduction information is expressed in the form of a card on each terminal device, and the information arranged in this fashion may be exchanged between players as if exchanging business cards.

Figure 28:
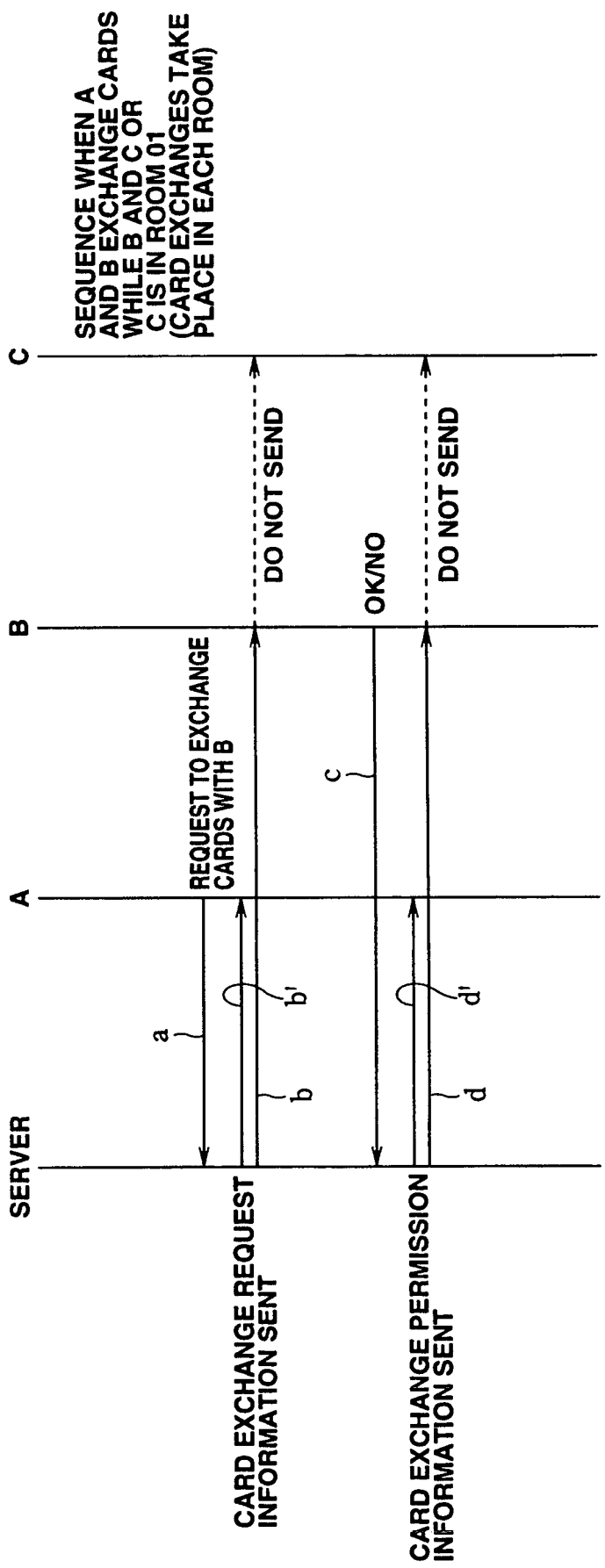
FIG. 28 is a drawing showing the communication protocol used during a card exchange.

FIG. 28 shows the communication protocol for card exchanges between the servers and the game devices. In FIG. 28, A, B and C are game devices 1, and an example is shown in which A, B and C have already entered a prescribed room, and A has asked B to exchange cards.

First, A sends a request to the server, via the signal a, that seeks a card exchange with B. After receiving this request, the server notifies B (via the signal b) that a card exchange request has been issued by A, and informs A via the signal b' that it has sent said notification to B. When this occurs, because no card exchange request was issued for C, the server does not transmit any message to C.

Next, B, which has received A's request for a card exchange, notifies the server whether it is willing to exchange cards, in the form of OK or NO (signal c).

The server conveys B's response to A (signal d), and then informs B that the server has sent B's response to A (signal d'). When this occurs, because no card exchange request was issued for C, the server does not transmit any message to C.

Figure 8:
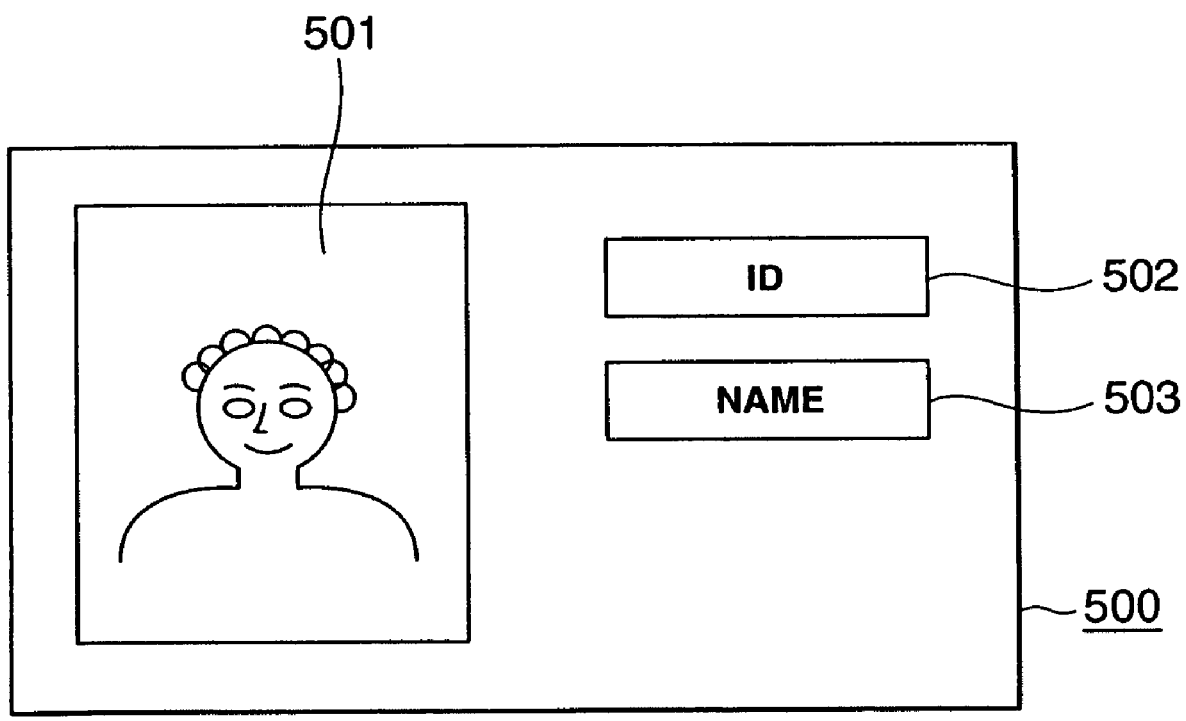
FIG. 8 is a drawing showing the display screen with the configuration of a card in this system.

FIG. 8 is a drawing showing the screen 500 showing the state in which the personal introduction information is arranged in the form of a card. The data used to create the card screen includes character codes corresponding to a character that comprises the equivalent of a self-portrait of the player, the player's ID, the player's name, game data regarding the player's past results, the frequency with which the game was played, the percentages of time that various types of games were selected, etc. The game device 1 forms the character codes, ID, name and other information into display data in the form of a card, and displays this data on the video monitor 4 of the game device as a card graphic 500 as shown in FIG. 8. This card graphic 500 includes a character 501 displayed in the square area, personal ID 502 and name 503.

[Operation to Exchange Personal Information]

Figure 9:
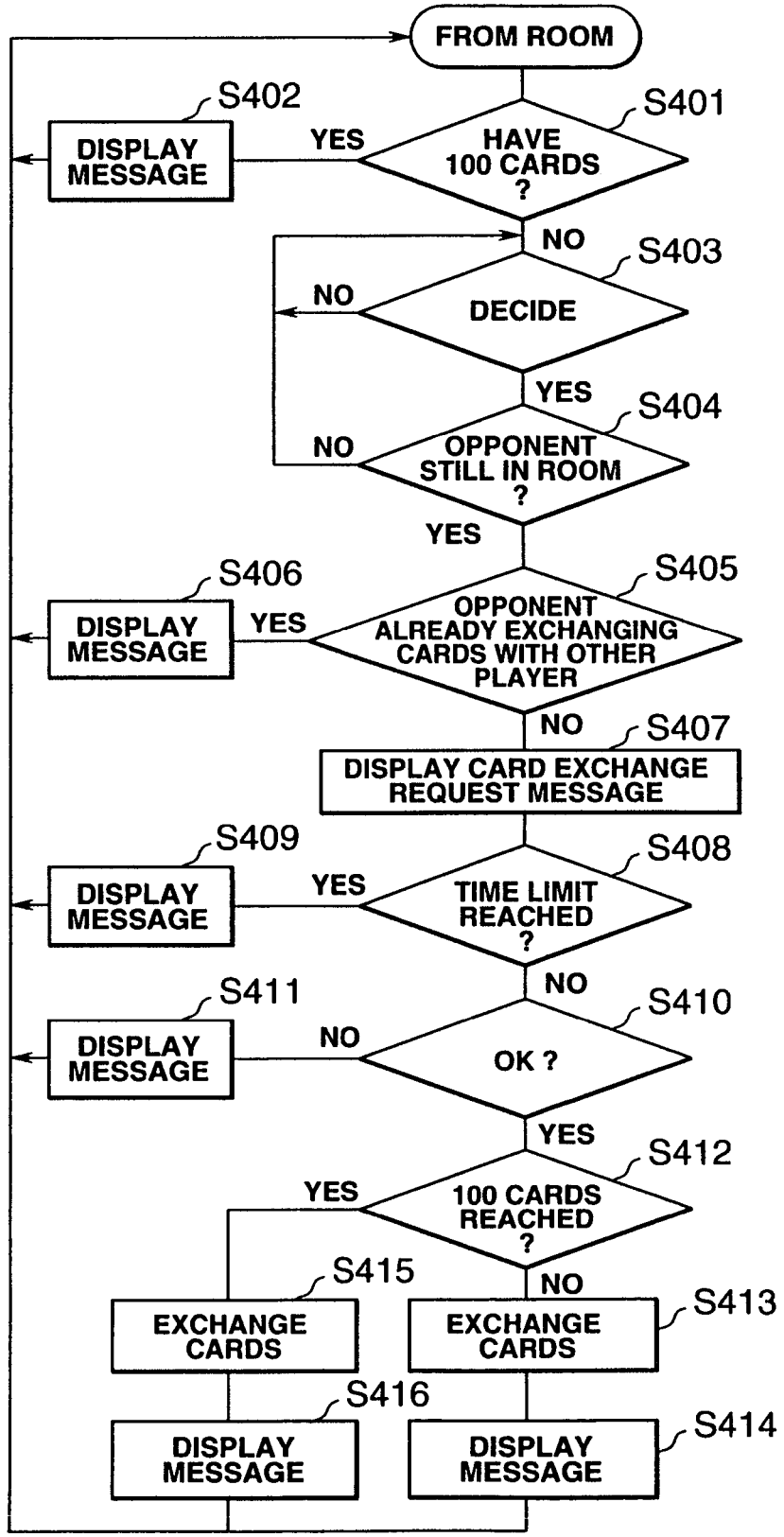
FIG. 9 is a flow chart to explain the operation performed on the side sending the card in this system.
Figure 10:
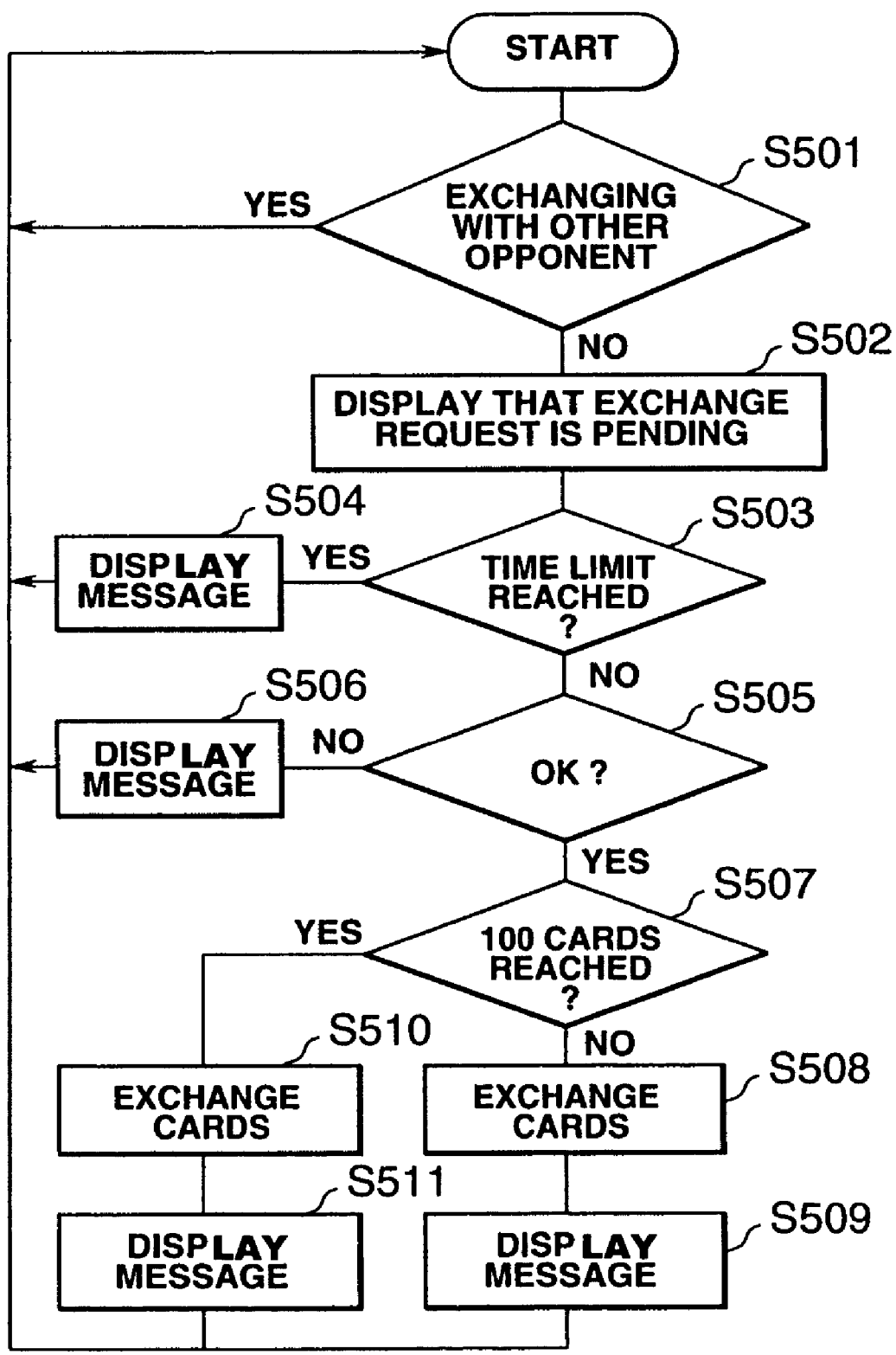
FIG. 10 is a flow chart to explain the operation performed on the side receiving the card in this system.
Figure 11:
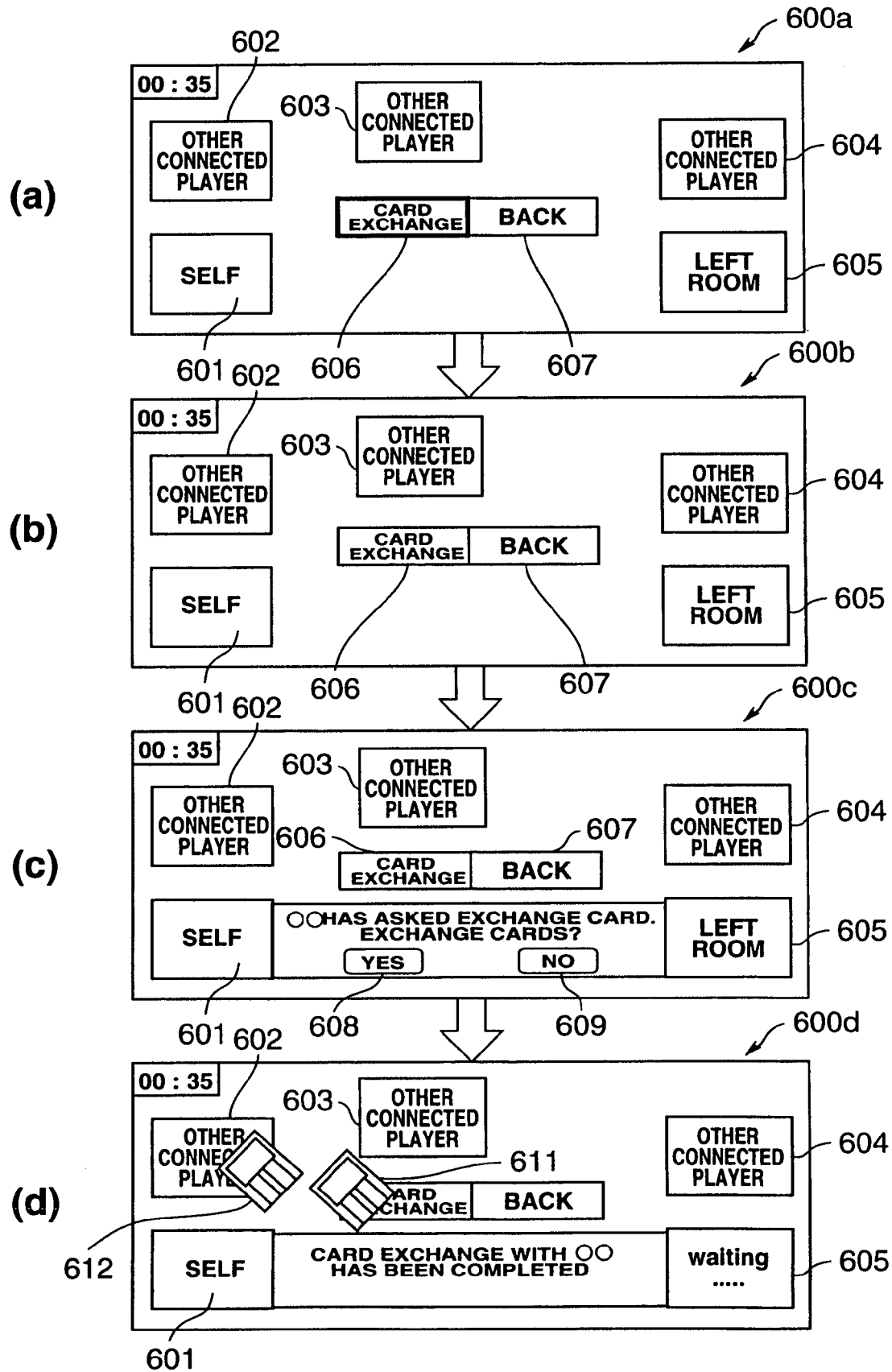
FIG. 11 is a drawing showing the screen displayed while the process shown in FIGS. 9 and 10 is underway.

The operation to exchange personal information will now be explained. FIG. 9 is a flow chart to explain the operation of the game device on the side of the player sending the card. FIG. 10 is a flow chart to explain the operation of the game device on the side of the player receiving the card. FIG. 11 is a drawing showing in a sequential manner the screens displayed when the processes described in the flow charts of FIG. 9 and FIG. 10 are performed.

The exchange of information between individual players is carried out through the exchange of cards. Players cannot exchange cards while a game is being played, but may exchange them before the game has started or after it has ended. However, the permitted timing of a card exchange can be changed.

When the card exchange described in the flow charts of FIGS. 9 and 10 is carried out, the screens 600 shown in FIGS. 11(*a*) through 11(*d*) corresponding to the current stage of the process are displayed. The contents of the screen 600 will be explained simply. Data 601 describing the player himself is displayed at the lower left of the screen 600. In addition, name and other brief data 602, 603, 604 and 605 comprising self-introduction data regarding other players connected to the individual game space (room) in which the player is participating is displayed. 605 indicates brief data regarding players not currently present in the same 'individual game space (room)'. In the center of the screen 600 are displayed a card exchange button 606 that carries out a card exchange with a player selected from among the players connected to the 'individual game space', and a 'Back' button 607 by which to return to the process described on the previous screen.

When the game device 1 is connected to the server 73*x*, the initial screen from which to select the type of game is displayed. When a specific game screen is selected, the 'lobby' game screen described above, comprising the initial screen for that game, is displayed. FIG. 7 displays the game screen for this 'lobby'. Of the types of games available, 'mah-jongg' is chosen. 'Room' refers to the unit in which mah-jongg is played, and comprises four players. Players may enter game spaces in which the number of players has not yet reached four. To enter a desired room, a player selects the 'Connect to room' icon 404. To create a new room and recruit mah-jongg game participants, the player selects the 'Create new room' icon 403.

When the player selects 'Room' or 'Create new room', the game device executes a process by which the game is played with other players, and displays the corresponding screen. In FIG. 7, 406 is an icon indicating a location where cards may be exchanged. In the example of FIG. 7, cards are exchanged in a 'Room' with the three other players. 405 is a button used to return to the previous process. The 'lobby' is a large game space designed for each type of game, while a 'room' is equivalent to an individual game space comprising a group of players that are playing a game with each other, and is formed under the 'lobby'. A player can easily engage with other game players by choosing a type of game, entering the 'lobby', and then choosing a 'room', thereby simplifying the process by which a player can participate in a network game.

When a player clicks on the 'Exchange cards' button while in a 'room', the process shown in the flow chart of FIG. 9 begins.

When the 'Exchange cards' button is clicked on, the game device 1 immediately determines whether the player wishing to exchange cards already possesses 100 cards obtained in trades with other players (S401 in FIG. 9). If 100 cards have already been obtained (YES in S401 in FIG. 9), the message 'You have already reached the limit of 100 cards. Please organize your cards.' is displayed on the video monitor 4 (S402 in FIG. 9), and the game device returns to the initial state.

If the limit of 100 cards has not yet been reached (NO in S401 in FIG. 9), the game device 1 displays the screen 600*a* shown in FIG. 11(*a*) on the video monitor 4 and waits for the person with whom a card will be exchanged to be determined (NO in S403). If any button is clicked on (YES in S403), the game device 1 detects the content of the button, and if the 'Cancel' button' is chosen, the game device returns to the initial state.

If any button is clicked on (YES in S403), and a particular player among the other players in the 'room' is selected after the game device 1 determines the content of the button, as shown in FIG. 11(*b*), it is determined through communication with the server 73*x* whether the selected player is still in the room (S404).

If it is determined that the selected player has already left the 'room' (NO in S404), the game device 1 waits once more for a button to be clicked on (NO in S403). On the other hand, if the other player has not yet left the room (YES in S404), it is determined whether or not the other player is exchanging a card via the server 73*x* (S405).

If the other player is exchanging a card (YES in S405), the game device displays the message 'That player is currently exchanging cards with another player.' on the video monitor 4 (S406), and then returns to the initial state. On the other hand, if the other player is not exchanging cards with another player (NO in S405), the game device 1 issues a card exchange request to the other game device 1, and displays the message 'Requesting card exchange . . . ' on the video monitor 4 (S407).

Meanwhile, the other game device 1 that receives the card exchange request executes the process shown in the flow chart of FIG. 10. First, provided that no card exchange is being carried out with another player (NO in S501 shown in FIG. 10), the message '_____ has asked to exchange cards. OK?' is displayed on the video monitor 4 connected to the other game device 1, as shown in FIG. 11(*c*) (S502 in FIG. 10). In addition to this message, an 'Accept (card exchange)' button 608 and a 'Do not accept' (card exchange) button 609 are displayed on the screen 600*c*.

The other game device 1 waits for input from the player for a limited time, such as 10 seconds (S503 in FIG. 10). If the other game device 1 does not receive from the player an input choosing to either accept or refuse the card exchange within the time limit (YES in S503), data indicating a refusal to exchange cards is sent to the game device 1, the message 'Because no response was received within the allotted time, the card exchange cannot take place.' is displayed (S504 in FIG. 10), and the other game device 1 returns to the initial state in the flow chart of FIG. 10.

If the other game device 1 receives an input from the player within the time limit either accepting or refusing the card exchange (NO in S503 in FIG. 10), the input is confirmed (S505 in FIG. 10), and if the input refuses the card exchange (NO in S505), data indicating a refusal of the card exchange is sent to the game device 1 that requested the card exchange, the message 'The card exchange request was refused.' is displayed on the video monitor 4 (S506 in FIG. 10), and the other game device 1 returns to the initial state in the flow chart of FIG. 10.

Where the other game device receives an input accepting the card exchange from the player (YES in S505 in FIG. 10), the other game device then determines whether the accumulated number of cards that have been exchanged has reached a prescribed amount, such as 100 (S507 in FIG. 10), and if the limit of 100 cards has not been reached (NO in S507), the card exchange process is carried out. Icons 611 and 612 indicating that a card exchange is underway are displayed as shown in FIG. 11(d), and the message 'Card exchange with _____ completed.' is displayed on the screen (S508 in FIG. 10).

The message 'Please don't forget to save.' is then displayed on the video monitor 4 connected to the other game device 1 (S509 in FIG. 10), and the process ends.

Returning to FIG. 9, if a response either accepting or refusing the card exchange is not received within the time limit (YES in S408 in FIG. 9), the message 'A response was not received within the allotted time.' is displayed (S409 in FIG. 9), and the process ends, and the game device 1 returns to the initial state in the flow chart of FIG. 9.

If a response is received within the time limit (NO in S408 in FIG. 9), the game device 1 confirms the response (S410 in FIG. 9), and if the response is a refusal (NO in S410), the game device 1 displays the message 'The card exchange was refused.' on the video monitor 4 (S411 in FIG. 9), and then returns to the initial state in the flow chart in FIG. 9.

On the other hand, if a response is received accepting the card exchange (YES in S410 in FIG. 9), the game device 1 determines whether or not 100 cards have been exchanged (S412 in FIG. 9), and if 100 cards have not been exchanged (NO in S412), the card exchange process is carried out, and the message 'Card exchange with _____ completed.' is displayed (S413 in FIG. 9).

The message 'Please don't forget to save.' is then displayed on the video monitor 4 connected to the other game device 1 (S414 in FIG. 9), and the process ends.

When the current exchange represents the 100$^{th}$ card exchanged (YES in S412 in FIG. 9, YES in S507 in FIG. 10), the card exchange is carried out (S415, S511), but the message 'The card exchange was successful, but no more cards may be held. Please organize your cards.' is displayed on the video monitor 4 of the applicable game device 1 (S416, S511), and the game device 1 returns to the initial state.

Figure 12:
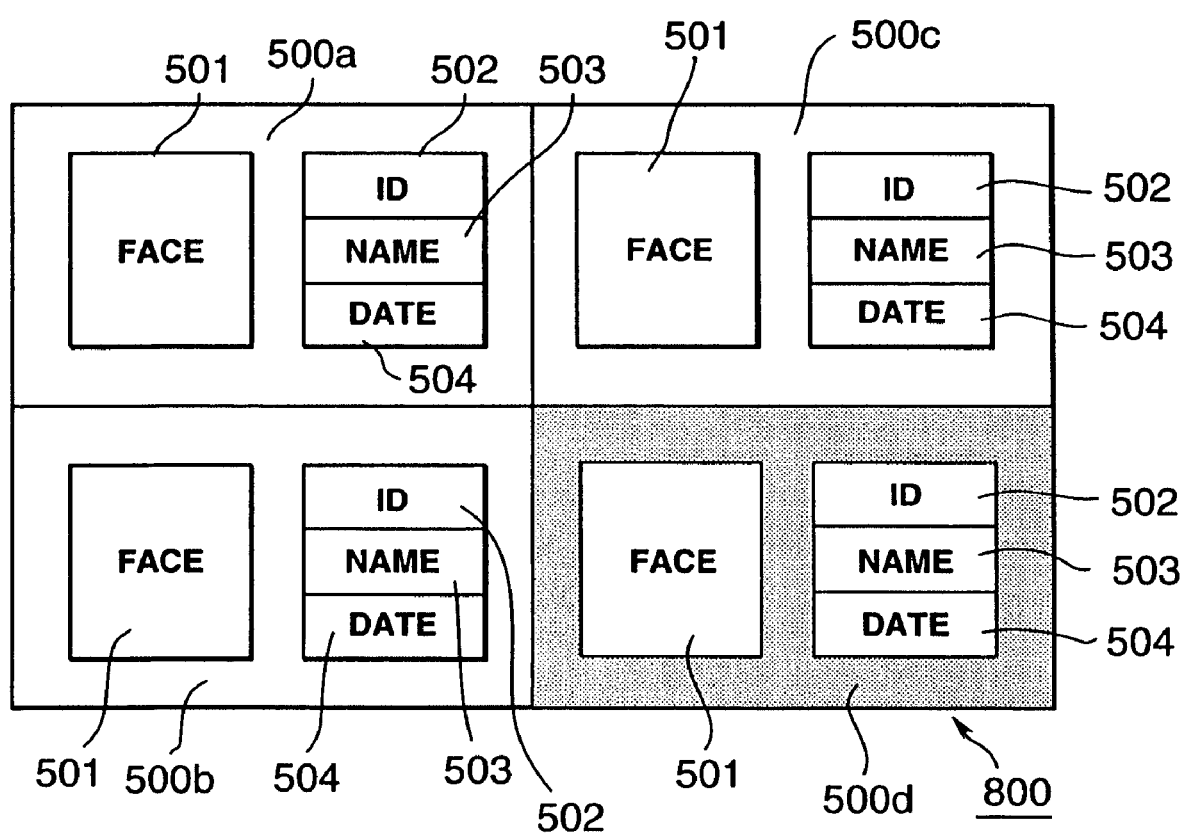
FIG. 12 is a front view of the card list in this system.

When the cards received in exchange are saved, as shown in FIG. 12, they are organized as a card list 800 and stored in a prescribed memory area. This card list 800 can save four cards 500a through 500d on one page, and includes the date 504 on which the cards were exchanged, and the content of the game and the points scored can also be saved with the information on the cards 500a through 500d.

The necessary data for these cards is stored in a prescribed memory area for each game terminal device or player.

A character (501 in FIG. 8) is displayed in the card described above. The character is an aggregation of specified parts. By selecting these parts appropriately, the player can design his own character.

Figure 13:
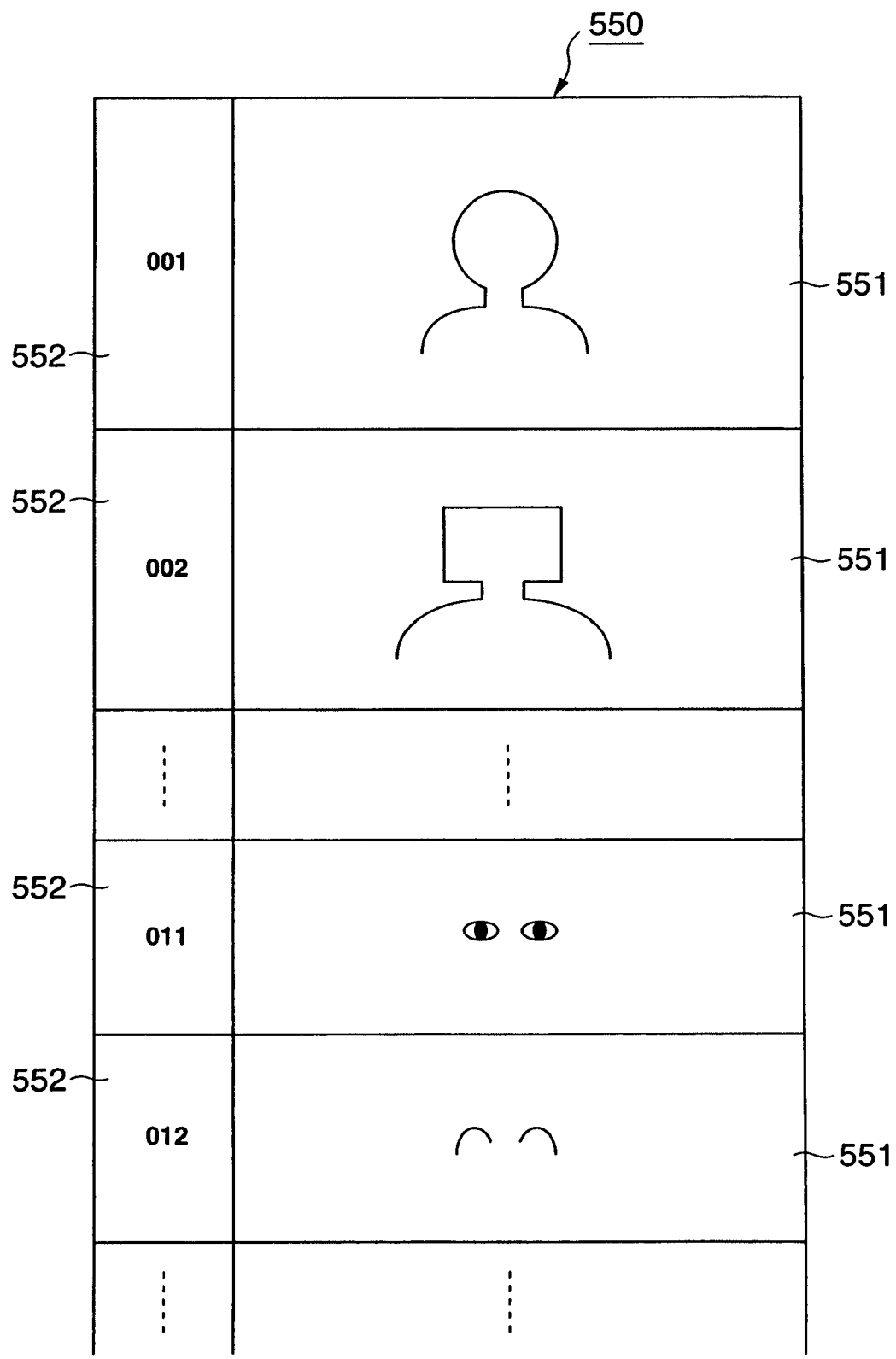
FIG. 13 is a drawing showing a table that describes the relationship between each part and its code in this system.

FIG. 13 shows the situation in which a code is assigned to each part, and the part and the code are cross-linked in a table. This table is stored in a prescribed memory area in each game terminal device. In other words, in each game device 1, in order to create a character 501 on the card 500, a plurality of characters 501 are divided into parts 551, each part 551 is assigned a corresponding code 552, and the resulting table 550 is stored in the ROM 1b or the work RAM of each game device 1.

The parts 551 that form the characters comprise several frameworks for the upper torso of a man, several types of hair styles to be inserted in these human frameworks, several types of eyes, noses and mouths, several animal frameworks, several types of eyes, noses and mouths to be inserted in these animal frameworks, a robot framework, and several types of eyes, noses and mouths to be inserted in the robot framework.

To create the character 501 on the card 500, the player selects parts 551 in the game device 1, displays them on the video monitor 4, and creates the desired character 501. The player then pastes the character onto the card 500.

When the character 501 is sent from the game device 1 that initiated the card exchange to the game device 1 comprising the target of the card exchange, only the codes 552 for the parts 551 forming the character 501 are sent to the other game device 1. The receiving game device 1 extracts the parts 551 from its own internal table 500 based on the received codes 552 and creates a character 501, and then displays the character 501 on the video monitor 4 as a part of the card 500. Therefore, because only text data (letter data) is sent between the game device 1 that initiated the card exchange and the game device 1 comprising the target of the card exchange, and image data (graphic data) need not be sent, the transmission speed for the card exchange may be increased.

As described above, because this embodiment enables a player to have the perception of traveling to a resort area, moving from a 'lobby' to a 'game room', and playing an entertaining game, and permits the exchange of personal introduction information in the game space of that 'room', using as a medium data on a business card, etc., it is easy and enjoyable for anyone to play the game, as well as easy to obtain personal introduction information regarding other players.

Second Embodiment

Figure 14:
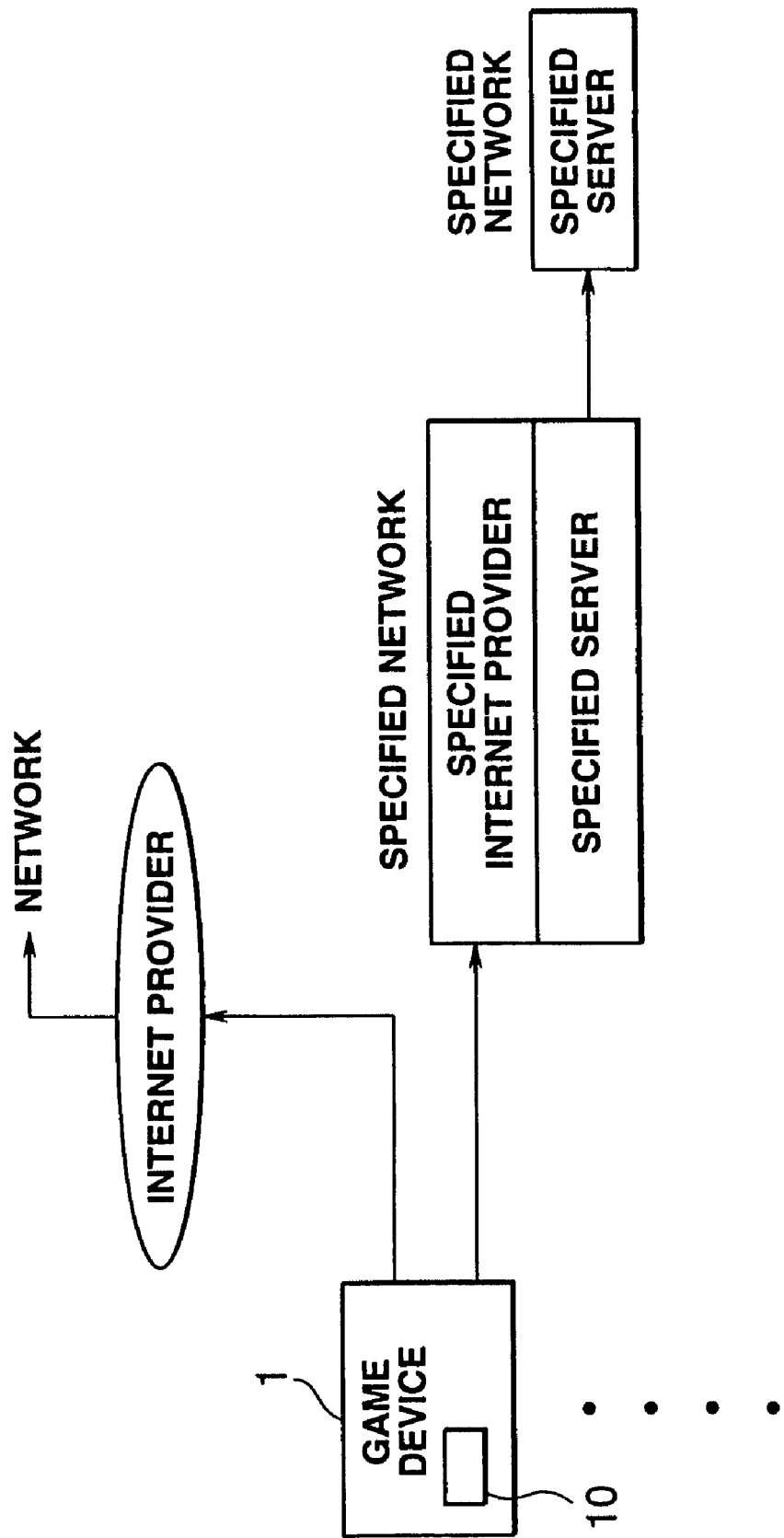
FIG. 14 is an example of the game system pertaining to a second embodiment of the present invention.

FIG. 14 is a block diagram showing an example of the communication network pertaining to a second embodiment of the present invention. Each game device can access various networks by means of an Internet provider. The game device can connect to a general network described above by connecting to a high-level specified server on a specified network. Each game machine can also access a low-level specified server that is subsidiary to the high-level specified server, to connect to a low-level specified network by means of this low-level server. The high-level specified network by means of the high-level server is a network created for a household game machine of the same type as this system, while the low-level specified network is a network constructed specifically for the game system of the present invention. Making the low-level game network subordinate to the high-level game network makes the management and design of the specified game system easier.

In the embodiment described above, the personal information comprises game-related information in particular, and includes individual game results and game preferences.

(Variations of the First and Second Embodiments)

Variations of the first and second embodiments described above will now be explained.

First, a first variation is characterised in that the card data includes the number times a card has been exchanged, and the screen display of the card changes depending on how many times a card has been exchanged. In other words, the card 500 data DT contains the number of times the card has been exchanged (a number equivalent to the 'number of times the player has met another player') in the network game system. This number of previous exchanges is accumulated each time a card is exchanged with the same player, and is saved as part of the card data.

For example, as shown in FIG. 15, a 'Number of Meetings/Evaluation Table' is recorded in the sub-server 73 of the game parent station 7 as table data. As can be seen from the drawing, the 'Card color CL', 'Character motion MO', 'Character background BK' and 'Title SR' all change in accordance with the 'Number of meetings'.

The 'Number of meetings' is broken down into 'one or more, 'two or more', 'four or more', 'six or more', 'eight or more', and 'ten or more'. Where a card exchange falls into the 'two or more' through 'eight or more' categories, the content of the 'Card color CL', 'Character motion MO', 'Character background BK' and 'Title SR' changes depending on whether the gender of the exchange initiator (oneself) and the gender of the card exchange target player (the other player) are the same or different, i.e., whether the players are of the same sex or the opposite sex, even if the 'Number of meetings' (i.e, the number of card exchanges) with that player is the same.

When a card is exchanged, the game device 1 calculates how many exchanges including the current exchange have occurred with the same opponent, and matches the result with the 'Number of Meetings/Evaluation Table' in the sub-server 73 of the game parent station 7. It then updates the 'Card color CL', 'Character motion MO', Character background BK' and 'Title SR' components of the card data in accordance with the result of the matching operation, and subsequently carries out the card exchange process using this card data. Because the initiating player's card data is sent to the other player, and the target player's card data is received from the target player, both data items are saved.

Figure 16:
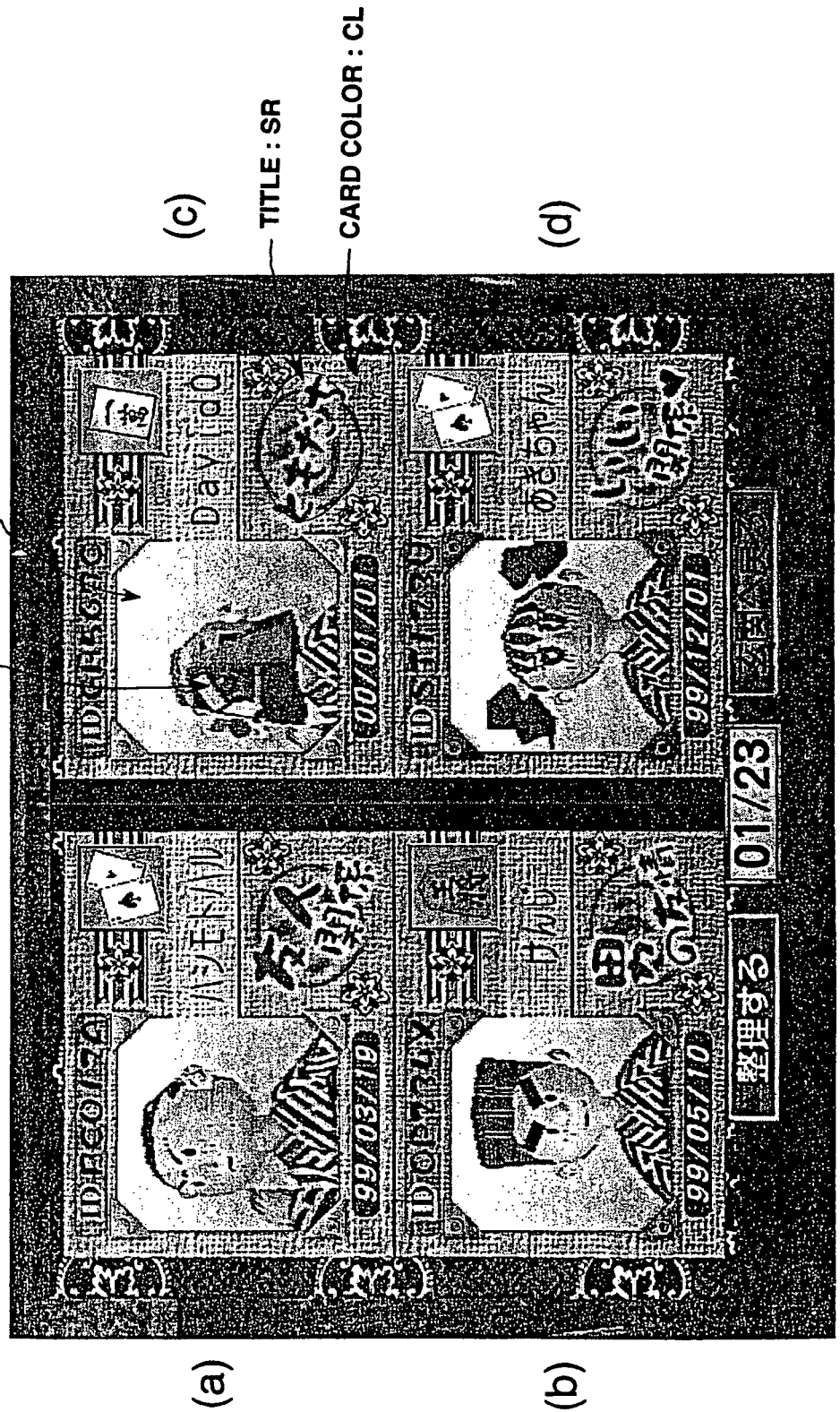
FIG. 16 is a screen shot of the various types of cards with different backgrounds in accordance with the number of previous encounters.

The card list in which the exchanged card data is displayed is shown in FIGS. 16(*a*) through 16(*d*). As can be seen from the drawing, the parameters pertaining to the configuration of the objects displayed in the form of cards (the 'Card color CL', 'Character motion MO', Character background BK' and 'Title SR') change in accordance with the 'Number of meetings'.

By changing the objects displayed in the form of cards in accordance with the number of card exchanges (number of meetings), a sense of friendship between users may be added to the game.

The second variation will now be explained based on FIGS. 17 and 18. In the second variation, when a card exchange takes place, the sender's e-mail address may be attached to the card, so that e-mail may be sent to a user that attaches his e-mail address from within the game application. This e-mail address may be made usable in other applications as well.

Figure 17:
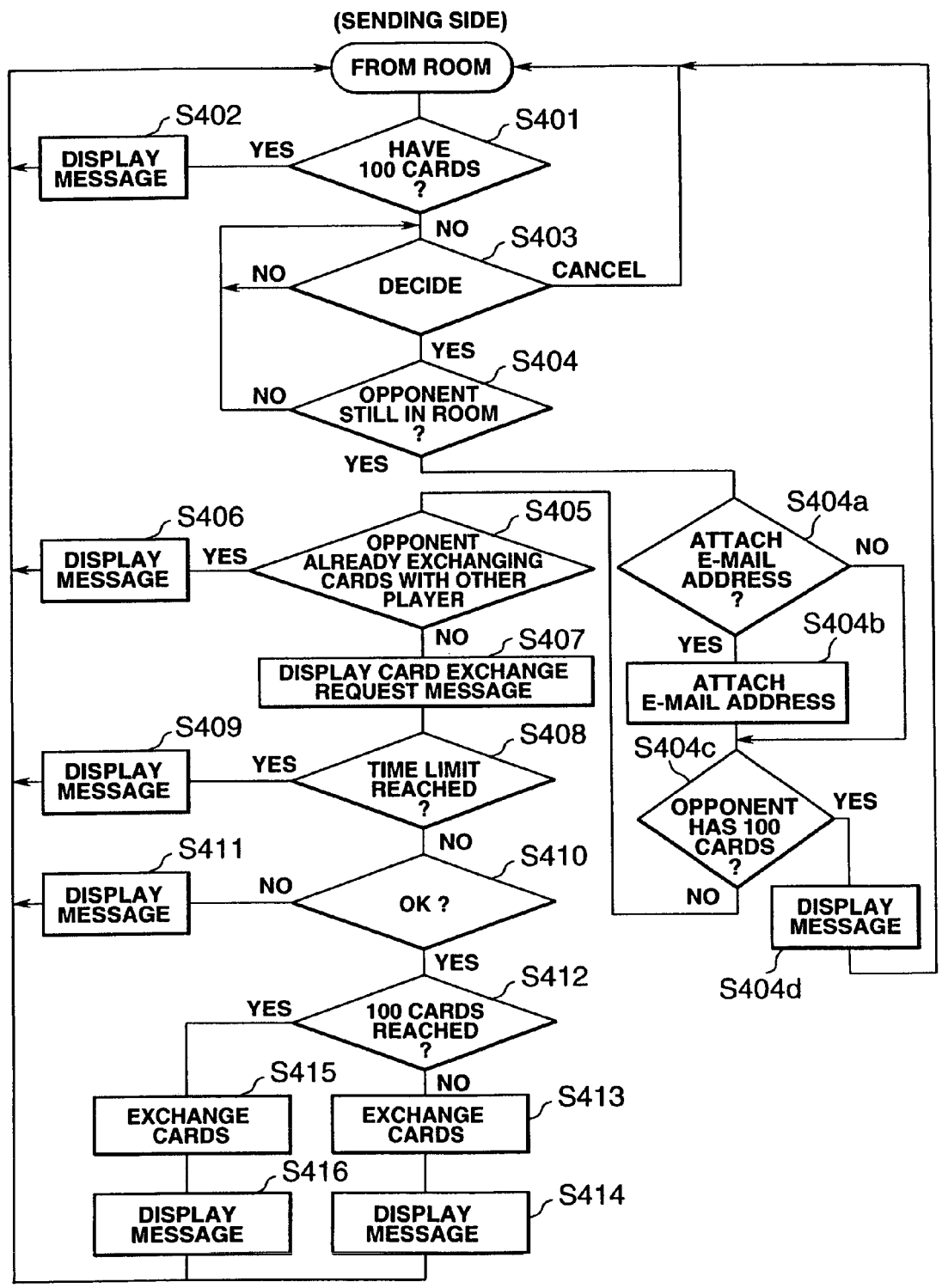
FIG. 17 is a flow chart explaining the process of the game device on the side of the person sending the card pertaining to a second variation.
Figure 18:
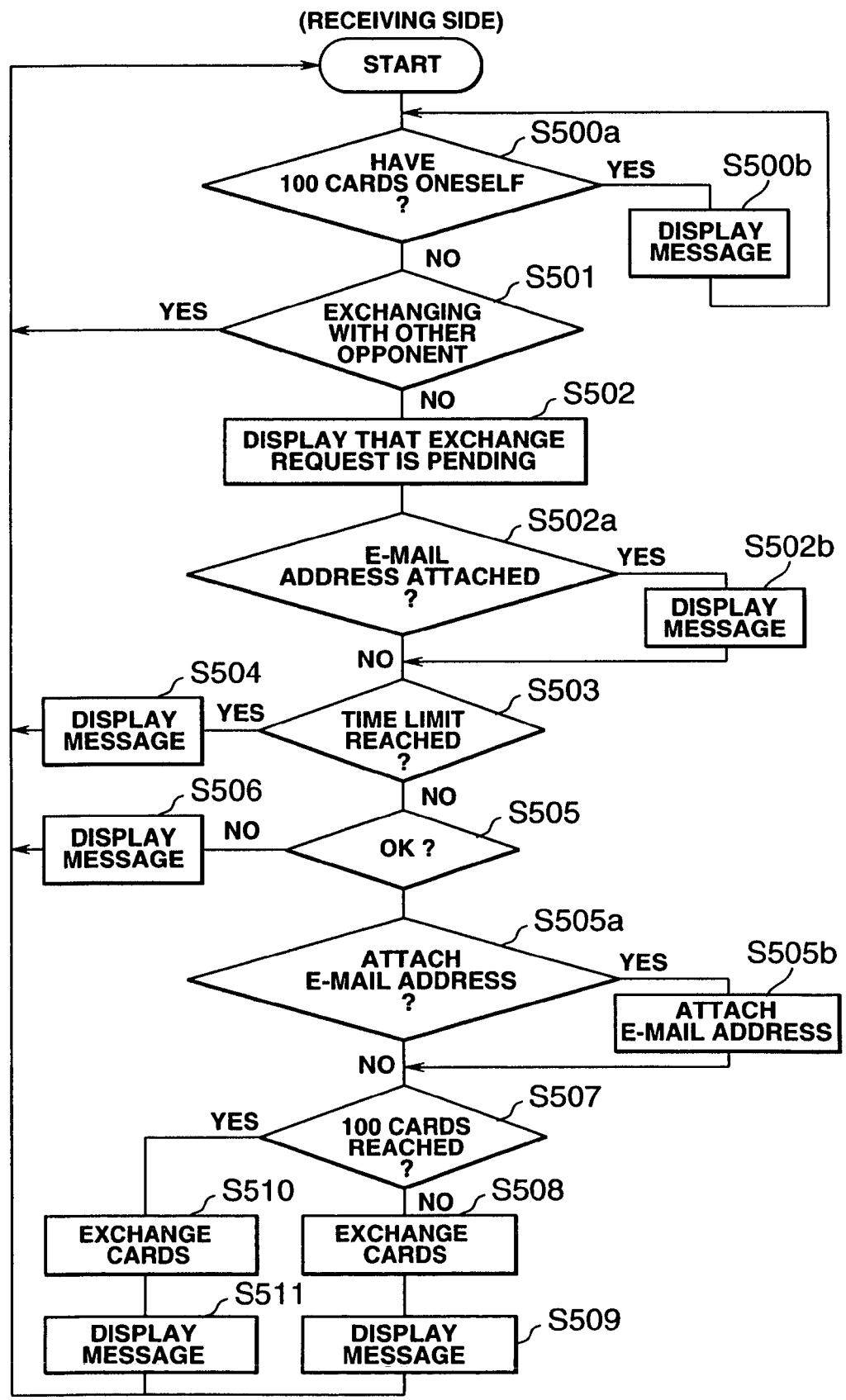
FIG. 18 is a flow chart explaining the process of the game device on the side of the person receiving the card pertaining to the second variation.

In this second variation, the game device 1 on the side sending the card carries out the process shown in FIG. 17, and the game device 1 on the side receiving the card carries out the process shown in FIG. 18. The process shown in FIG. 17 corresponds to that shown in FIG. 9. In FIG. 17, however, the processes of S404*a* through S404*d* are added. The process shown in FIG. 18 corresponds to that shown in FIG. 10. In FIG. 18, however, the processes of S500*a*, S500*b*, S502*a*, S502*b*, S505*a* and S505*b* are added.

In the process shown in FIG. 17 for the side sending the card, if it is determined that the other player has not left the game room (YES in step S404), the game device 1 determines whether or not to attach its own e-mail address to the card data (step S404*a*) based on interactive input from the user. If this determination is YES, the process of attaching the user's e-mail address to the card data is executed (step S404*b*). If the determination is NO (i.e., do not attach e-mail address), step S404(*b*) is skipped.

It is next determined whether or not the other user is already in possession of a prescribed number of cards (here, 100) through prior exchanges (step S404*c*). If this determination is NO, i.e., if it can be confirmed that the other user does not yet have 100 cards, and there is sufficient room in the card data memory, the processes of steps S405 and beyond are carried out in the same way as shown in FIG. 9. Conversely, if the determination is YES, i.e., if it is determined that the other user already has 100 cards, the message 'Because the other player has already reached the limit of 100 cards, the card exchange cannot take place.' is displayed (step S404*d*), and the game device 1 returns to the initial state in FIG. 17.

On the other hand, where the process of FIG. 18 for the side receiving the card is carried out, the game device 1 begins the process by determining whether or not it already has a prescribed number of cards (here, 100 cards) (step S500*a*). If the determination is YES, i.e., if the game device 1 determines that it already has 100 cards, the message '_____ has asked to exchange cards, but because you have already reached the limit of 100 cards, the card exchange cannot take place.' is displayed on the video monitor 4 (step S500*b*), and the game device 1 returns to the process of step 500*a*. Conversely, if the determination in step 500*a* is NO (i.e, the player does not yet have 100 cards), after it is determined whether or not a card exchange is underway with any other player and the existence of a card exchange request is displayed (steps S501, S502), the processes of steps S502*a* and S502*b* are performed.

In step S502*a*, the game device 1 determines whether or not the requesting player's e-mail address is attached to the card data, and if the determination is NO (i.e., the e-mail address is not attached), it carries out the processes of steps S503 and S505. Conversely, if the determination is YES (i.e., the e-mail address is attached), the message 'An e-mail address is attached.' is displayed on the video monitor 4 (step S502*b*), and the game device 1 proceeds to the process of step S503.

If there is ultimately an input from the user accepting a card exchange in step S505 (YES in step S505), the game device 1 determines, based on the user's input, whether or not to attach its e-mail address to the card data (step S505*a*). If the determination is YES, i.e., if the e-mail address is to be attached to the card data, the game device 1 executes the process to attach its own e-mail address to its own card data to be sent to the player requesting the card exchange (step S505*b*). Conversely, if the answer is NO (i.e., if the card is to be exchanged in accordance with the request, but the e-mail address is not to be attached to the card data), the game device 1 does not execute the e-mail address attachment process of step S505*b*, and proceeds to the card exchange processes of step S507 and beyond.

Excluding the processes described above, the other processes are identical to those shown in FIGS. 9 and 10.

Therefore, e-mail addresses can be attached to card data and exchanged by means of this e-mail address attachment process. Another characteristic of this variation is that it offers players the freedom to choose the items to be exchanged in accordance with their degree of closeness with another player, such as by exchanging a card but not yet their e-mail address. In this way, a relatively broad spectrum of communication may be made available for an online game, thereby increasing the variety of chances of game.

A third and fourth variation will now be explained. These variations pertain to using the exchanged card data with applications other than the game application of the present invention.

In the third variation, the card data is read by other applications, so that it may be handled as a common format not only by one application but by a plurality of applications over the network. To obtain this construction, a common area from which the card data may be read by other applications is reserved in the memory area for data saved in this game application. Normally, the saved game data is encrypted, and the ordinary user cannot rewrite it or read it, but the card data should be saved in a common format in a certain area containing saved data, such that the card data may be read by means of a prescribed program. In that case, confidentiality is preserved by having the common format and the prescribed program undergo prescribed encryption, and by using the encryption codes during decoding.

In the fourth variation, the card data contains information on individual preferences. The card data contains individual preference information such as 'I like cars'. Where a flag that indicates this type of personal information is included in the card data, when this flag is read in a car-based network game, it is displayed as a priority item in the card. In addition, 'For what game was the card exchanged?' can be specified in other applications. In this way, communication while playing the network game can take place more smoothly, and the application can be given greater flexibility. Furthermore, by means of this system, information may be transmitted among a plurality of applications.

Third Embodiment

A third embodiment of the present invention will now be explained with reference to FIGS. 19 through 22.

The game system pertaining to this embodiment is characterised in that a 'game tournament' is constructed on the network, and particularly in that, in order to ensure smooth and fair administration of the tournament, penalties are imposed for violations of the rules that players are required to follow in order to play the game (such violations include copying data or resetting the game while the game is underway, and are termed 'bad acts' here).

Figure 19:
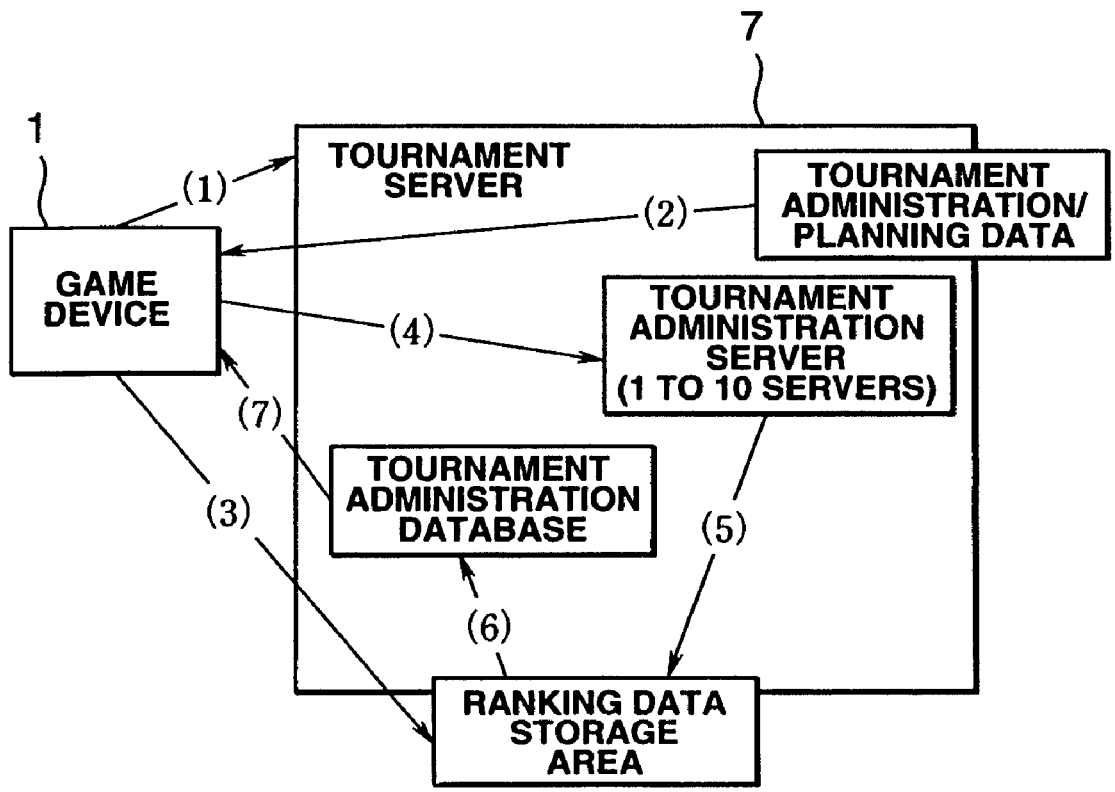
FIG. 19 is a drawing explaining the game tournament concept pertaining to a third embodiment of the present invention.

The network-based game tournament is carried out based on play data provided for a fixed period of time, and involves the announcement of rankings. The concept is shown in FIG. 19. Because the server of the game parent station 7 used in the game system lacks a database function, a database specifically dedicated to the tournament is used in order to prevent users from committing violations (game resetting, data copying, etc.).

The tournament server is built into the game parent station 7. This tournament server includes a tournament planning server, a tournament administration server (this role is performed by one of the first through tenth servers), a ranking data storage area, and a tournament authentication database, all of which are software-based. Each game device 1 participates in the game tournament carried out on the tournament server in roughly the order specified below. For purposes of explanation, the numbers below in parentheses, which indicate the order in which the steps are performed, correspond to the numbers located inside the arrows in the drawing.

(1) The game device 1 connects to the tournament server.
(2) The 'tournament administration planning server' checks the current status of the tournament and downloads the tournament status data to the client (game device 1).
(3) Where the client indicates an intention to participate in the game tournament, the client's data is registered in the 'tournament authentication server'. This enables the client to participate in the tournament.
(4) The client enters the game server that is administering the game tournament, and plays the game.
(5) The play data generated during the game tournament is saved in the tournament authentication server.
(6) The results of the game tournament are calculated for each day, and the data is organized to create rankings.
(7) To view the rankings, the client downloads the rankings data.

Tournament planning is performed by converting into data various information regarding the timing, location and nature of the game to be played, and the rules that will govern them, and maintaining this data in the tournament server. The game tournament is basically run over successive days for a fixed period. Because the servers can go down at any time, requiring suspension of the game, this data may be changed. The data managed during administration of the tournament includes, for example, (1) the number of players participating in the tournament, (2) the game to be played (e.g., mah-jongg, chess, etc.), (3) the rules to be applied (rule setting), (4) the date the tournament began, (5) the tournament period (i.e., the number of days), (6) the minimum number of matches (i.e., the prescribed number of matches), (7) the name of the tournament (text data, displayed via downloading), and (8) data regarding the tournament sponsor (displayed via downloading).

A client wishing to participate in the tournament must express his desire to participate in the game tournament while playing the game. If the maximum number of participants has not been exceeded, the client may participate. If the number of participants recorded in the tournament database is already at the maximum, the client is notified that he cannot participate.

A basic rule is established for the game tournament, which is that if a user participating in the game tournament has not finished the 'prescribed number of matches', the user is deemed to have not completed his participation, and the user's final game results will not be saved. A further condition is that the prescribed number of matches must be completed during the tournament period. However, a player may play more than the prescribed minimum number of matches.

Figure 20:
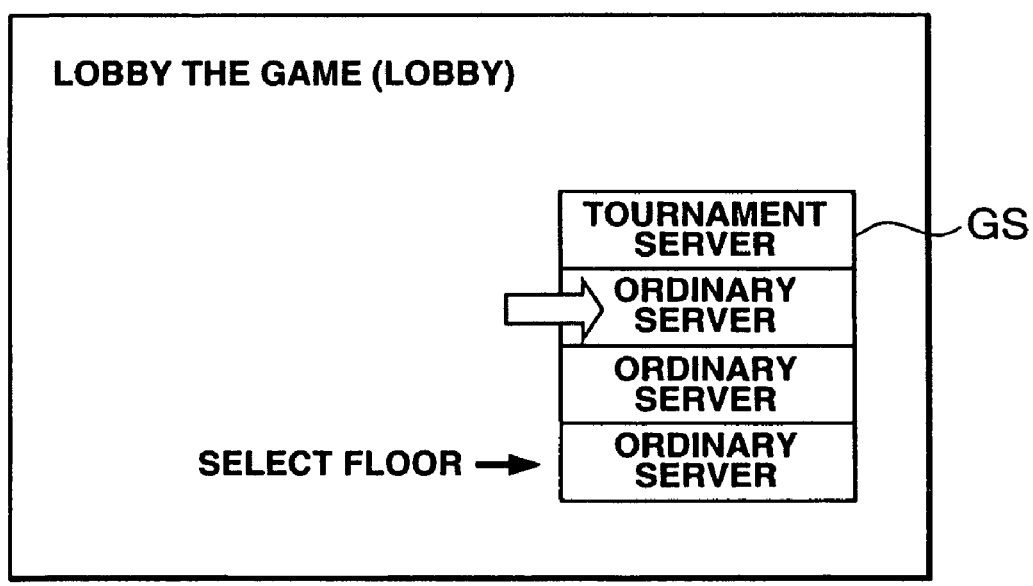
FIG. 20 is a drawing explaining the tournament server used in the game tournament.

The conceptual construction of the tournament administration server GS is shown in FIG. 20. The server GS may have its own format, or may have the same format as a standard game server. However, persons other than clients (users) eligible to participate in the tournament may not enter rooms in which games are being played (however, they may observe).

Figures 21, 22:
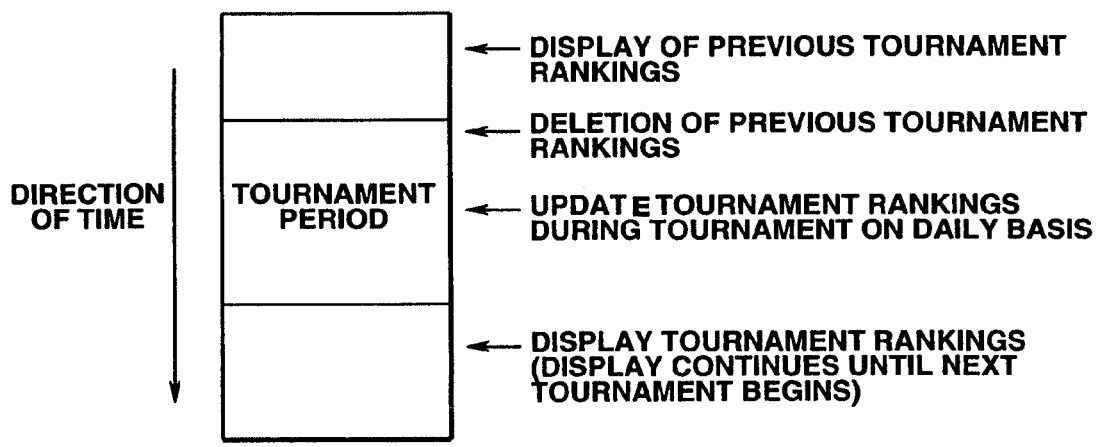
FIG. 21 is a list explaining the play data items saved in the tournament authentication database.
FIG. 22 is a drawing explaining the time sequence of the game tournament.

All data regarding participation and play in a game tournament (involving mah-jongg, chess, etc.) is saved in a tournament authentication database residing in the game parent station. An example of the saved data is shown in FIG. 21. Specifically, the data comprises (1) player name data, (2) player face data, (3) player participant ID number data, (4) tournament play data totals, (5) data regarding the number of tournament matches, (6) player IP address data, (7) player personal ID data, and (8) information regarding bad acts (number of resets, etc.).

In particular, the last item described in item (8) above, information regarding bad acts, refers to bad faith violations such as resetting the game and leaving the game room before the prescribed number of matches have been played despite the fact that the player was participating in the game tournament. The next time such a 'bad user' attempts to participate in a game tournament, he is either given a warning or assessed a penalty, in order to discourage the commission of such acts in the future.

The methods by which bad acts are determined and a warning given or a penalty imposed comprise either methods involving action by the tournament administration server, or methods involving action by the application (game software).

<1A: Methods of Performing Determination Via Server>

There are two methods.

(a) In one method, the tournament administration server continuously manages all clients. The number of times that a client leaves a game room during a match or uses prohibited language is observed in detail, and records of these acts are registered in the tournament database.

(b) In another method, clients are managed only when they enter and leave a game (i.e., when they enter or leave a game room). This method manages users who have not left a game (i.e., left a room) by means of the official method (that is, users that have disconnected their telephone). Compared to the previous method in which clients were continuously managed, this management method has the advantage of reducing the burden on the tournament administration server.

<1B: Method of Issuing Warning Via Server>

The method by which the tournament administration server issues a warning has the features described below.

(a) In the case of a household game machine, because the game device 1 is certainly connected to a for-pay server (not shown in the drawings), the next time a client that has committed bad acts connects to the server, the for-pay server issues the warning or rejects the connection attempt by the user. When this occurs, a blacklist containing the names of bad users may be shared among a plurality of games. In other words, a client listed on a blacklist for game A may be issued a warning or denied access to game B as well.

(b) Each gate server (not shown in the drawings) manages user IDs, and when a client who has committed bad acts next attempts to connect, the server sends a blacklist flag to the client. When this flag is raised in the client's game application, a warning is issued by means of a mark or message indicating 'Blacklisted player' being superimposed on the player's face displayed on the video monitor.

(c): Each gate server (not shown in the drawings) manages user IDs, and when a client who has committed bad acts next attempts to connect, the server sends a blacklist flag to the client. When this flag is raised in the client's game application, a warning is issued by means of a 'warning message' being displayed on the screen each time the player connects to the network.

(d): A blacklist of players who have committed bad acts is created in the tournament database. The data in the tournament authentication database is checked based on this list, and a warning is issued via e-mail in response to the results of this check.

<2A: Method of Determination Via Application>

There are two methods.

(a): In the first method, flags are raised when the game starts and when it ends. In a normal game, game results and other data is saved when the game ends. By contrast, when this method using flags is used, a minus flag is saved when the game starts, and when the game ends, a minus flag is added to the normal game results so that the minus is offset. For example, when the game begins, 'one loss' is written, and when the game ends, this 'one loss' is returned to the original number. In this way, a client who thinks 'I'm losing, so I'll just quit' and leaves the game will acquire a 'loss', which will discourage early game departures. This method has the advantage of imposing no burden on the server.

(b): In this method, certain conditions that determine the existence of bad acts are incorporated into the application, and where these conditions are met, this information is written into a fixed area in the RAM of the game system main unit. In this way, because flags are not raised in just one application, but may be shared across a plurality of applications, the 'number of reset operations' and the use of 'prohibited language', may be determined.

<2B: Method of Issuing Warning Via Application>

The application-side warning method has the following features.

(a): In the case of a household game machine, a 'blacklisted player' flag is written in the server unit, and this warning will thereafter be generated regardless of which game software is run.

(b): A flag from the blacklist is written into the RAM in the game system main unit, and this 'blacklist flag' is thereafter raised in all applications.

(c): A flag is inserted in the game data to be saved, and penalties are imposed that bar the selection of some items (such as face parts, games, etc.), depending on the seriousness of the bad acts.

As described above, the existence and nature of bad acts may be reliably determined on either the server side or the application side, and an appropriate warning or sanction may be imposed in accordance with the seriousness thereof. In other words, when a client who has committed bad acts next connects to the same game tournament or a different game, the flag in the saved data may be changed, and a warning such as 'Reset is not allowed during a game' may be given. In addition, where the seriousness of the bad act exceeds a prescribed standard, the client may be denied access on the next connection attempt.

In this way, the occurrence of bad acts such as premature game departures (resets) may be eliminated or inhibited, and a game tournament environment may be created that is appealing to clients participating in the game.

Furthermore, data regarding game play is saved in the tournament authentication database. This data is processed on a daily basis, and the ranking of the top 100 clients, for example, is saved in a ranking data storage area. This ranking information can be downloaded by clicking on a download button from a menu, and may thereafter be viewed by a user. Downloadable information is limited to the items 1 through 5 listed in FIG. 21.

When the tournament period ends, the final rankings are calculated, and only the clients who have completed the minimum number of matches are ranked. When the tournament period ends, the final rankings will continue to be displayed until the next tournament. The relationship between the game tournament and the ranking display is shown in a summary fashion in FIG. 22.

In the embodiments of the present invention, the authentication server performs control operations to ensure that players are charged when they access the specified game server. In addition, when a bad player accesses the system, the specified game server or the authentication server performs control operations by which his game terminal device is informed that the player is a bad player.

INDUSTRIAL APPLICABILITY

According to the invention described above, a plurality of players connected to a specified server can easily enjoy a game in a relaxed fashion, and personal information regarding game opponents can be exchanged, so that new acquaintances and friends may be made while enjoying the game.

The invention claimed is:

1. A network game system, comprising:
a plurality of game servers, each storing a plurality of game application programs;
a plurality of game terminal devices, each connected to one of the plurality of game servers via a network and configured to execute at least one of the plurality of game application programs; and
an authentication server connected to the plurality of game terminal devices and the plurality of game servers, the authentication server configured to control whether a connection between one of the plurality of game terminal devices and at least one of the plurality of game servers is permitted,
wherein the at least one of the plurality of game servers sends play information to the authentication server, the play information including information regarding an execution status of the at least one of the plurality of game application programs executed by the one of the plurality of game terminal devices, the authentication server stores the play information and, in accordance with the play information, determines whether the connection between the one of the plurality of game terminal devices and the at least one of the plurality of game servers is permitted.

2. The network game system according to claim 1, wherein, in accordance with the result of the determination, the authentication server stops the connection between the one of the plurality of game terminal devices and the at least one of the plurality of game servers for a predetermined period of time.

3. The network game system according to claim 2, wherein the play information includes historical information indicating that the one of the plurality of game terminal devices has ended execution of the at least one of the plurality of the game application programs in a method different from an official method.

4. A server system connected to a game terminal device via a network, the server system enabling the game terminal device to execute a plurality of game application programs, the server system comprising:
a plurality of game servers, each storing the plurality of game application programs; and
an authentication server connected to the game terminal device and to the plurality of game servers, the authentication server configured to control whether a connection between the game terminal device and at least one of the plurality of game servers is permitted,
wherein the at least one of the plurality of game servers sends play information to the authentication server, the play information including information regarding an execution status of at least one of the plurality of game application programs executed by the game terminal device, the authentication server stores the play information and, in accordance with the play information, determines whether the connection between the game terminal device and the at least one of the plurality of game servers is permitted.

5. The server system according to claim 4, wherein, in accordance with the result of the determination, the authentication server stops the connection between the game terminal device and the at least one of the plurality of game servers for a predetermined period of time.

6. The server system according to claim 5, wherein the play information includes historical information indicating that the game terminal device has ended execution of the at least one of the plurality of the game application programs in a method different from an official method.

7. A network game system arranged such that a plurality of game terminal devices are connected to a server system via a network and the plurality of game terminal devices communicate with each other via the server system to execute a plurality of game application programs, the server system comprising:
a plurality of game servers storing the plurality of game application programs, the plurality of game application programs being executed amongst the plurality of game terminal devices; and
an authentication server connected to the plurality of game terminal devices and the plurality of game servers,
wherein, upon execution of at least one of the plurality of game application programs, at least one of the plurality of game servers determines whether at least one of the plurality of game terminal devices has performed a predetermined act and reports a determination result to the authentication server, and based on the determination result, the authentication server registers identification information for identifying a particular one of the plurality of game terminal devices that has been identified as having performed the predetermined act, and based on the identification information, the authentication server controls whether the particular one of the plurality of game terminal devices is permitted a future connection to the at least one of the plurality of game servers.

8. The network game system according to claim 7, wherein, based on the identification information, the authentication server restricts a connection from the particular one of the plurality of game terminal devices to the at least one of the plurality of game servers for a predetermined period of time.

9. The network game system according to claim 7, wherein when the authentication server permits or restricts the connection from the particular one of the plurality of game terminal devices to the at least one of the plurality of game servers based on the identification information, the authentication server sends to the particular one of the plurality of game terminal devices a signal that indicates whether the connection is permitted or restricted.

10. A server system for use in a game system, the game system arranged such that a plurality of game terminal devices are connected to the server system via a network, and the plurality of game terminal devices communicate with each other via the server system to execute a plurality of game application programs, the server system comprising:
a plurality of game servers storing the plurality of game application programs, the game application programs being executed amongst the plurality of game terminal devices; and
an authentication server connected to the plurality of game terminal devices and to the plurality of game servers,
wherein, upon execution of at least one of the plurality of game application programs, at least one of the plurality of game servers determines whether at least one of the plurality of game terminal devices has performed a predetermined act, and reports a determination result to the authentication server, and based on determination result from the at least one of the plurality of game servers, the authentication server registers identification information for identifying a particular one of the plurality of game terminal devices that has been recognized as having performed the predetermined act, and based on the identification information, the authentication server controls whether the particular game terminal device is permitted a future connection to the at least one of the plurality of game servers.

11. The server system according to claim 10, wherein, based on the identification information, the authentication server restricts a connection from the particular one of the plurality of game terminal devices to the at least one of the plurality of game servers for a predetermined period of time.

12. The server system according to claim 10, wherein when the authentication server permits or restricts the connection from the particular one of the plurality of game terminal devices to the at least one of the plurality of game servers based on the identification information, the authentication server sends to the particular one of the plurality of game terminal devices a signal that indicates whether the connection is permitted or restricted.

13. A game terminal device used with a server system, the server system connected to the game terminal device via a network, the server system enabling the game terminal device to execute at least one of a plurality of game application programs with a plurality of other game terminal devices, the server system determining, upon execution of the at least one of a plurality of the game application programs, whether at least one of the game terminal device and the plurality of other game terminal devices has performed a predetermined bad act, the server system registering identification information for identifying a particular one of the game terminal devices that has been recognized as having performed the predetermined bad act, the game terminal device comprising:

a communication unit controlling a connection with the server system;

writable memory;

a warning information writing unit configured to obtain the identification information from the server system, and if the identification information indicates that the game terminal devices is registered as the particular one of the plurality of game terminal devices that has performed the bad act, write warning information indicating the registration to the writable memory; and a display control unit configured to display whether the connection is permitted or restricted, on a display unit, if the warning information is written in the writable memory and if the communication unit attempts the connection to the server system.

14. A game terminal device used with a server system connected to the game terminal device via a network, the server system enabling the game terminal device to execute at least one of a plurality of game application programs with a plurality of other game terminal devices, the server system determining, upon execution of the at least one of a plurality of the game application programs, whether at least one of the game terminal device and the plurality of other game terminal devices has performed a predetermined bad act, the server system registering identification information for identifying a particular one of the game terminal devices that has been recognized as having performed the predetermined bad act, the game terminal device comprising:

a communication unit controlling a connection with the server system;

writable memory;

a warning information writing unit configured to obtain the identification information from the server system, and if the identification information indicates that the game terminal device is registered as the particular one of the game terminal devices that has performed the bad act, write warning information indicating the registration to the writable memory; and a function restricting unit configured to restrict certain functions, if the warning information is written in the writable memory and if the communication unit attempts the connection to the server system.

\* \* \* \* \*

UNITED STATES PATENT AND TRADEMARK OFFICE
CERTIFICATE OF CORRECTION

PATENT NO. : 7,618,320 B2
APPLICATION NO. : 10/852251
DATED : November 17, 2009
INVENTOR(S) : Hashimoto et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 1248 days Delete the phrase "by 1248 days" and insert -- by 1576 days --

Signed and Sealed this

Twenty-fourth Day of August, 2010

David J. Kappos
*Director of the United States Patent and Trademark Office*